United States Patent
Capodieci

(10) Patent No.: US 8,028,503 B2
(45) Date of Patent: Oct. 4, 2011

(54) METHOD AND SYSTEM FOR ULTRASONIC SEALING OF FOOD PRODUCT PACKAGING

(75) Inventor: Roberto A. Capodieci, Glen Ellyn, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/031,247

(22) Filed: Feb. 14, 2008

(65) Prior Publication Data

US 2008/0178560 A1 Jul. 31, 2008

Related U.S. Application Data

(60) Continuation of application No. 11/301,534, filed on Dec. 13, 2005, now abandoned, which is a continuation of application No. 10/334,629, filed on Dec. 31, 2002, now abandoned, which is a division of application No. 09/884,808, filed on Jun. 19, 2001, now Pat. No. 6,574,944.

(51) Int. Cl.
*B29C 65/08* (2006.01)
*B65B 51/10* (2006.01)

(52) U.S. Cl. ...... 53/479; 53/374.2; 156/73.1; 156/580.2

(58) Field of Classification Search ............... 53/459, 53/450, 479, 550, 482, 374.2, 374.4; 156/73.1, 156/73.3, 580.1, 580.2, 582
See application file for complete search history.

(56) References Cited

U.S. PATENT DOCUMENTS

| | | | |
|---|---|---|---|
| D55,542 S | 6/1920 | Wipf | |
| 2,145,941 A | 2/1939 | Maxfield | |
| D117,043 S | 10/1939 | Huber | |
| 3,029,751 A | 4/1962 | Gilmore | |
| 3,031,804 A | 5/1962 | Thatcher et al. | |
| 3,044,510 A | 7/1962 | Schneider et al. | |
| 3,114,643 A | 12/1963 | Boston et al. | |
| 3,199,437 A | 8/1965 | Nelsen | |
| D212,542 S | 10/1968 | McCarthy | |
| 3,407,077 A | 10/1968 | Helin | |
| 3,416,398 A | 12/1968 | Bodine | |
| RE26,543 E | 3/1969 | Beeson et al. | |
| 3,434,906 A | 3/1969 | De Greeve et al. | |
| 3,505,136 A | 4/1970 | Attwood | |
| 3,615,712 A | 10/1971 | Keller | |
| 3,636,859 A | 1/1972 | Null | |

(Continued)

FOREIGN PATENT DOCUMENTS

AT 382 112 B 1/1987

(Continued)

*Primary Examiner* — Sameh H. Tawfik
*Assistant Examiner* — John Paradiso
(74) *Attorney, Agent, or Firm* — McAndrews, Held & Malloy, Ltd.

(57) ABSTRACT

A method and system for ultrasonic sealing of food product packaging is provided. The ultrasonic sealing system preferably includes a food product packaging-positioning system that delivers food product packaging and food product into direct on-item-packaging forming box. The direct on-item-packaging forming box then receives the food product packaging and forms it directly around the supplied food product forming a partially packaged food product. The partially packaged food product is then ultrasonically edge sealed around the food product by an ultrasonic food product packaging fin-sealing unit forming a partially sealed food product packaging. The partially sealed food product packaging then enters a food product packaging end-sealing unit which ultrasonically seals and crimps the ends of the food product packaging resulting in a fully packaged and ultrasonically sealed food product.

12 Claims, 12 Drawing Sheets

U.S. PATENT DOCUMENTS

| | | |
|---|---|---|
| 3,819,089 A | 6/1974 | Scales |
| 3,829,007 A | 8/1974 | Ellison |
| 3,830,944 A | 8/1974 | Dimitriadis et al. |
| 3,873,735 A | 3/1975 | Chalin et al. |
| 3,895,118 A | 7/1975 | Rambold |
| 3,961,089 A | 6/1976 | Dogliotti |
| 3,971,838 A | 7/1976 | Yazawa |
| 4,017,237 A | 4/1977 | Webster |
| 4,055,109 A | 10/1977 | Kan |
| 4,097,327 A | 6/1978 | Calemard |
| 4,115,489 A | 9/1978 | Macfee |
| 4,163,768 A | 8/1979 | Stephens |
| D254,936 S | 5/1980 | Saunders |
| 4,216,639 A | 8/1980 | Gautier |
| 4,290,521 A | 9/1981 | Mitchell |
| 4,358,466 A | 11/1982 | Stevenson |
| 4,361,235 A | 11/1982 | Gautier |
| 4,394,395 A | 7/1983 | Rostagno et al. |
| 4,421,773 A | 12/1983 | Akutagawa |
| 4,453,370 A | 6/1984 | Titchenal |
| 4,500,280 A | 2/1985 | Astier et al. |
| 4,514,426 A | 4/1985 | Jordan et al. |
| 4,517,790 A | 5/1985 | Kreager et al. |
| 4,521,467 A | 6/1985 | Berger |
| 4,534,726 A | 8/1985 | Simelunas |
| 4,534,818 A | 8/1985 | Kreager et al. |
| 4,574,566 A | 3/1986 | Eaves et al. |
| 4,601,157 A | 7/1986 | Adelman |
| 4,605,123 A | 8/1986 | Goodrum et al. |
| 4,608,261 A | 8/1986 | MacKenzie |
| 4,616,470 A | 10/1986 | Nakamura |
| 4,631,901 A | 12/1986 | Chung et al. |
| 4,651,870 A | 3/1987 | Giambalvo |
| 4,652,456 A | 3/1987 | Sailsbury |
| 4,663,915 A | 5/1987 | Van Erden et al. |
| 4,663,917 A | 5/1987 | Taylor et al. |
| 4,685,602 A | 8/1987 | Hama |
| 4,689,942 A | 9/1987 | Chateau |
| 4,693,056 A | 9/1987 | Raszewski |
| 4,735,753 A | 4/1988 | Ackermann |
| D296,377 S | 6/1988 | Skiver et al. |
| 4,751,916 A | 6/1988 | Bory |
| 4,758,293 A | 7/1988 | Samida |
| 4,759,170 A | 7/1988 | Sawa et al. |
| 4,759,249 A | 7/1988 | Held |
| 4,774,797 A | 10/1988 | Colamussi et al. |
| 4,784,591 A | 11/1988 | Ackermann |
| 4,787,755 A | 11/1988 | Branson |
| 4,796,300 A | 1/1989 | Branson |
| 4,810,109 A | 3/1989 | Castel |
| 4,849,233 A | 7/1989 | Hemker |
| 4,864,802 A | 9/1989 | D'Angelo |
| 4,865,680 A | 9/1989 | Pierson |
| 4,879,124 A | 11/1989 | Oberle |
| 4,890,439 A | 1/1990 | Smart et al. |
| 4,909,870 A | 3/1990 | Gould et al. |
| 4,923,701 A | 5/1990 | VanErden |
| 4,937,410 A | 6/1990 | Anderson |
| 4,950,859 A | 8/1990 | Anderson |
| 4,972,995 A | 11/1990 | Schara et al. |
| 5,044,777 A | 9/1991 | Watkins et al. |
| 5,058,364 A | 10/1991 | Seiden et al. |
| 5,061,331 A | 10/1991 | Gute |
| 5,067,302 A | 11/1991 | Boeckmann |
| 5,096,532 A | 3/1992 | Neuwirth et al. |
| 5,104,674 A | 4/1992 | Chen et al. |
| 5,110,403 A | 5/1992 | Ehlert |
| 5,137,745 A | 8/1992 | Zukerman et al. |
| 5,161,350 A | 11/1992 | Nakamura |
| 5,181,365 A | 1/1993 | Garvey et al. |
| 5,202,064 A | 4/1993 | Furusawa et al. |
| 5,222,813 A | 6/1993 | Kopp et al. |
| 5,226,343 A | 7/1993 | Rawson et al. |
| 5,228,372 A | 7/1993 | Harrop et al. |
| 5,230,761 A | 7/1993 | Crawford |
| 5,257,510 A | 11/1993 | Cox |
| 5,280,844 A | 1/1994 | Kaufman et al. |
| 5,342,634 A | 8/1994 | Murata et al. |
| 5,358,727 A | 10/1994 | Yates et al. |
| 5,366,741 A | 11/1994 | Van Der Zon |
| 5,391,387 A | 2/1995 | Peters |
| 5,419,437 A | 5/1995 | Huseman |
| 5,435,712 A | 7/1995 | Probst |
| 5,437,215 A | 8/1995 | Hamilton |
| 5,519,982 A | 5/1996 | Herber et al. |
| 5,525,363 A | 6/1996 | Herber et al. |
| 5,552,165 A | 9/1996 | Haak et al. |
| 5,582,853 A | 12/1996 | Marnocha et al. |
| 5,645,681 A | 7/1997 | Gopalakrishna et al. |
| 5,660,679 A | 8/1997 | Rajala et al. |
| 5,667,824 A | 9/1997 | Ream et al. |
| 5,689,942 A | 11/1997 | Suga |
| 5,694,745 A | 12/1997 | Spatafora et al. |
| 5,706,635 A | 1/1998 | Simmons |
| 5,733,587 A | 3/1998 | Ream et al. |
| 5,752,423 A | 5/1998 | Rawson |
| 5,819,615 A | 10/1998 | Dale et al. |
| 5,827,559 A | 10/1998 | Powell |
| 5,846,584 A | 12/1998 | Capodieci |
| 5,861,185 A | 1/1999 | Capodieci |
| 5,863,585 A | 1/1999 | Sjoberg |
| 5,871,783 A | 2/1999 | Capodieci |
| 5,871,793 A | 2/1999 | Capodieci |
| 5,914,142 A | 6/1999 | Zartner |
| 5,928,695 A | 7/1999 | Capodieci |
| 6,032,561 A | 3/2000 | Lonn et al. |
| D422,774 S | 4/2000 | Hersh |
| 6,068,868 A | 5/2000 | Capodieci |
| 6,129,940 A | 10/2000 | Leadbeater |
| 6,143,336 A | 11/2000 | Capodieci |
| 6,165,298 A | 12/2000 | Samida et al. |
| 6,210,728 B1 | 4/2001 | Capodieci |
| 6,231,330 B1 | 5/2001 | Capodieci |
| 6,231,913 B1 | 5/2001 | Schwimmer et al. |
| 6,318,248 B1 | 11/2001 | Capodieci |
| 6,357,914 B1 | 3/2002 | Kinigakis et al. |
| 6,361,609 B1 | 3/2002 | Ouellette et al. |
| 6,368,647 B1 | 4/2002 | Capodieci |
| 6,403,132 B1 | 6/2002 | Capodieci |
| 6,403,138 B1 | 6/2002 | Arora |
| 6,431,849 B1 | 8/2002 | Capodieci |
| 6,477,820 B1 | 11/2002 | Dutra et al. |
| 6,517,879 B2 | 2/2003 | Capodieci |
| 6,530,767 B1 | 3/2003 | Capodieci |
| 6,537,401 B2 | 3/2003 | Couillard et al. |
| 6,540,854 B2 | 4/2003 | Couillard et al. |
| 6,554,931 B1 | 4/2003 | Blanchard et al. |
| 6,574,944 B2 | 6/2003 | Capodieci |
| 6,581,360 B1 * | 6/2003 | Hirsh et al. ............... 53/551 |
| 6,607,765 B2 | 8/2003 | Capodieci |
| 6,635,292 B2 | 10/2003 | Capodieci |
| 6,655,948 B2 | 12/2003 | Capodieci |
| 7,141,259 B2 | 11/2006 | Capodieci |

FOREIGN PATENT DOCUMENTS

| | | |
|---|---|---|
| AU | 733163 | 11/1998 |
| CA | D. 14902 | 2/1946 |
| CA | D. 41222 | 10/1976 |
| CA | D. 75746 | 2/1995 |
| CA | D. 79905 | 2/1997 |
| CA | 2 269 411 A1 | 10/1999 |
| DE | 29 22 834 A1 | 12/1980 |
| DE | 30 34 955 A1 | 3/1982 |
| DE | 88 09 048 | 10/1988 |
| DE | 40 17 363 A1 | 12/1991 |
| DE | 195 05 298 A1 | 8/1996 |
| DE | 197 16 141 A1 | 10/1997 |
| DE | 198 19 216 A1 | 4/1998 |
| EP | 0 084 903 A2 | 8/1983 |
| EP | 0 333 390 A2 | 9/1989 |
| EP | 0 478 812 A1 | 4/1992 |
| EP | 0 584 670 A1 | 3/1994 |
| EP | 0 499 647 B1 | 1/1995 |
| EP | 0 561 654 B1 | 1/1996 |
| EP | 0 776 608 B1 | 2/2002 |
| FR | 2 665 683 A1 | 2/1992 |
| GB | 952 581 | 3/1964 |

| | | |
|---|---|---|
| GB | 1 013 665 | 12/1965 |
| GB | 2 117 350 A | 10/1983 |
| GB | 2 171 077 A | 8/1986 |
| GB | 2 219 245 A | 12/1989 |
| GB | 2 276 138 A | 9/1994 |
| GB | 2 283 007 A | 4/1995 |
| GB | 2 332 387 | 6/1999 |
| GB | 2 381 650 A | 7/2003 |
| JP | 55-154119 | 12/1980 |
| JP | 57-91164 | 6/1982 |
| JP | 58-126144 | 7/1983 |
| JP | 63-138926 | 6/1988 |
| JP | 63-281934 | 11/1988 |
| JP | 63-315223 | 12/1988 |
| JP | 03-158227 | 7/1991 |
| JP | 04-200545 | 7/1992 |
| JP | 4-115111 U | 10/1992 |
| JP | 05-213306 | 8/1993 |
| JP | 10-045114 | 2/1998 |
| WO | WO 98/48642 | 11/1998 |
| WO | WO 99/33356 | 7/1999 |
| WO | WO 00/20191 | 4/2000 |
| WO | WO 03/020051 A1 | 3/2003 |

* cited by examiner

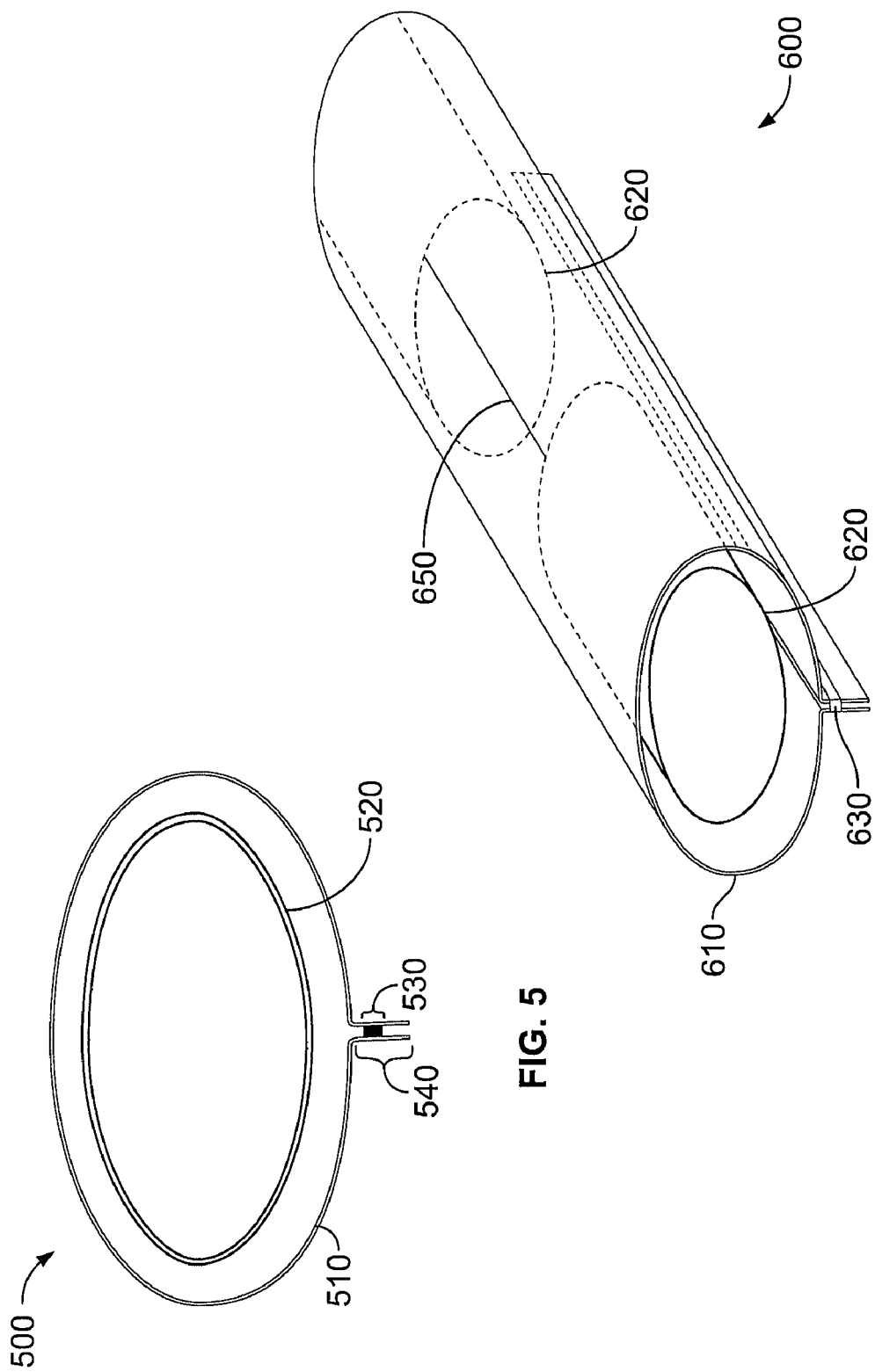

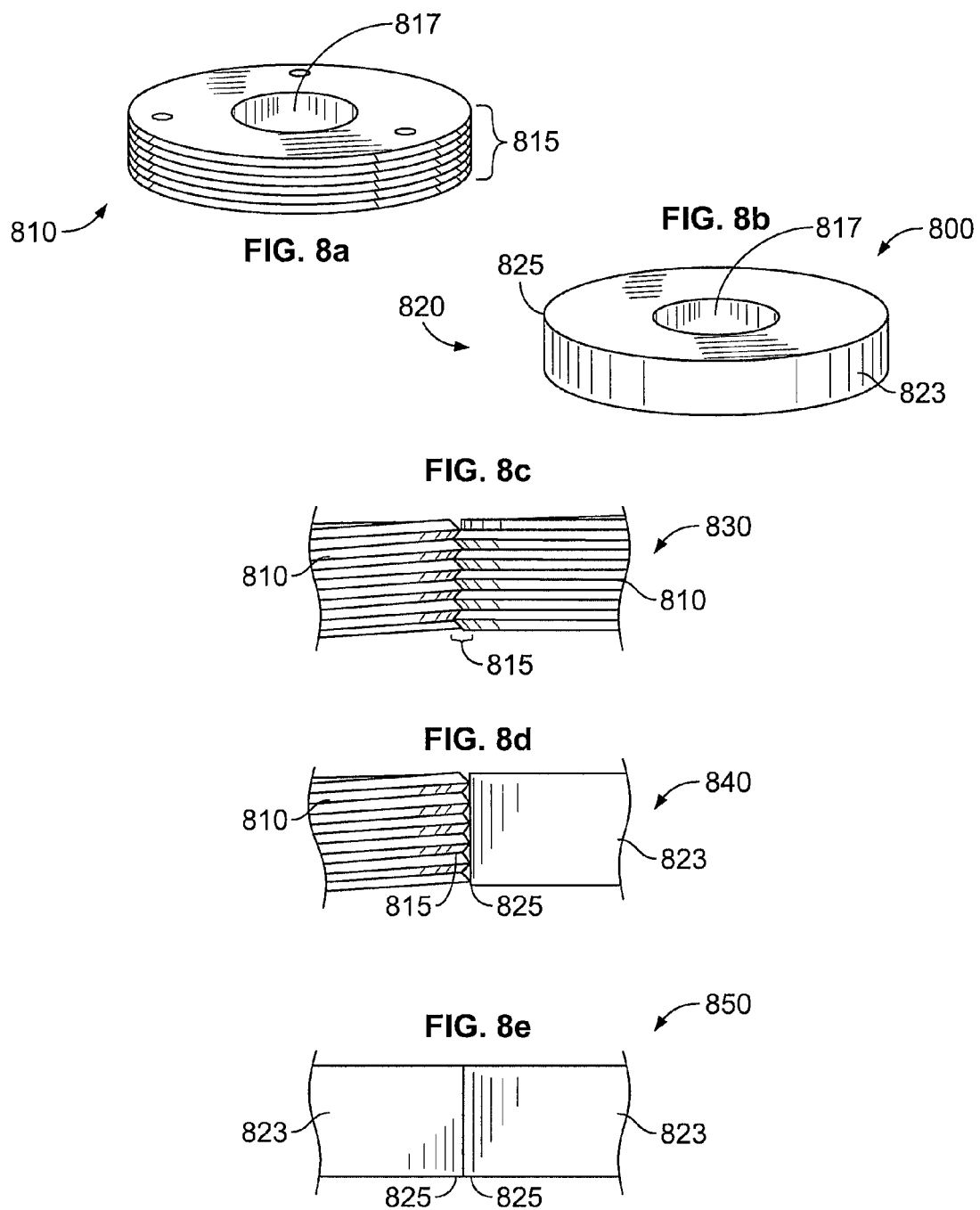

METHOD AND SYSTEM FOR ULTRASONIC SEALING OF FOOD PRODUCT PACKAGING

CROSS-REFERENCE TO RELATED APPLICATIONS

This application is a continuation of application Ser. No. 11/301,534 filed Dec. 13, 2005 now abandoned, which is a continuation of application Ser. No. 10/334, 629, filed Dec. 31, 2002 now abandoned, which is a divisional of U.S. patent application Ser. No. 09/884,808, filed Jun. 19, 2001 now U.S. Pat. No. 6,574,944, entitled "Method and System for Ultrasonic Sealing of Food Product Packaging," which is hereby incorporated by reference in its entirety.

BACKGROUND OF THE INVENTION

The present invention generally relates to a method and system for ultrasonic sealing of food product packaging. In particular, the present invention relates to a method and system for directly forming and ultrasonically sealing food product packaging around a food product.

Food products are typically packaged in packaging materials for distribution to consumer markets. The food product packaging materials typically may include plastic films, foil wrapping, or paper-based packaging materials. In practice, food products are introduced into the packaging material and the packaging material is then sealed to include the food product. Conventionally, many methods may be employed to seal the packaging material.

Traditionally, food product packaging materials may be sealed using either cold glue-based sealing methods or thermal-based sealing methods. Cold glue sealing typically involves the activation, for example by pressure, of a cold-glue adhesive that has been pre-applied to the edges of the packaging material. In practice, the packaging material may be formed into a desired shape to include the food product. In order to seal the packaging material, the packaging material is typically passed through a sealing apparatus. The sealing apparatus typically applies pressure to the edges of the packaging material to which the cold glue has been pre-applied. The pressure applied by the sealing apparatus activates the cold glue on the edges of the packaging material, causing the edges of the packaging material containing the cold glue to adhere and seal the food product packaging. Cold glue based sealing typically produces seals of sufficient strength for food product packaging applications. A seal of sufficient strength for food product applications is typically strong enough to hold the edges of the packaging material together during transport and handling, but able to be cleanly pulled apart by humans opening the package.

Unfortunately, the traditional cold glue based sealing method includes some significant drawbacks, including discontinuity and interruptions in packaging. For example, a significant problem encountered in cold glue based sealing is the formation of defective seals. For example, a defective seal may occur when an inadequate amount of cold glue is pre-applied to the packaging material. When an inadequate amount of cold glue is pre-applied to the packaging material the edges of the packaging material may not completely adhere together. If the edges of the packaging material do not completely adhere together, air may enter the package and have adverse effects on the food product. Another problem that may occur with cold glue based sealing is when the pressure applied to the edges of the packaging material including the cold glue is not sufficient to activate the cold glue. When the cold glue is not sufficiently or completely activated, the edges of the packaging material may peel away from each other, thus compromising the integrity of the seal. Proper seal integrity is when there are no channels in the seal between the outside of the packaging and the inside of the packaging. When the integrity of the seal is compromised, air enters the packaging and may negatively impact the food product quality. Typically, costly protective barriers are inserted into the laminated field. The barriers, or seals, are used to protect the integrity of the product enclosed within the sealed package. However, the barriers may be wasted if channeling occurs.

A further drawback typical in cold glue based sealing is that extremely precise alignment of the edges of the packaging material is typically required to form a proper seal. If the edges of the packaging material are not precisely aligned when they pass through the sealing apparatus, air pockets or wrinkles in the packaging may form "channels" in the seal. Channels are gaps in the seal through which air can enter the packaging material. As mentioned above, the introduction of air into the packaging may negatively impact the quality of the food product.

An additional drawback to cold glue based sealing is that the cold glue may be sensitive to atmospheric changes in the processing plant. For example, if the temperature or humidity in the plant reaches a critical level, the cold glue may become partially activated, causing the cold glue to adhere to an undesired surface, such as a roll or sheet feeding the packaging material. When the cold glue is prematurely activated and adheres to an undesired surface, the overall speed of the packaging process may be adversely affected, for example, by shutdown of the packaging process.

A further drawback of cold glue sealing is that cold glue sealing requires that the packaging material be sealed with a fairly wide seal. For example, a cold glue seal may require a seal of 10-15 millimeters in order to maintain the necessary integrity of the seal. Because a cold glue seal requires a relatively large seal, the seal requires a significant proportion of the total packaging material required to package the food product. Additionally, components of the system may become jammed during the packaging process. Thus, downtime in the system may occur due interruptions in the system.

The second traditional method of sealing food product packaging materials is thermal-based sealing. Typically, in thermal sealing, no adhesive is applied to the packaging material. Instead, the packaging material is sealed by passing the packaging material between a heated pair of jaws. The pair of jaws are typically heated using thermal conduction, for example, an electric current may be passed through a heating element mounted on the pair of jaws to heat the jaws. As the edges of the packaging material pass between the heated pair of jaws, the edges partially melt and adhere to each other.

Thermal sealing also suffers from a number of drawbacks. For example, thermal sealing is typically a relatively slow process compared to glue-based sealing. Thermal sealing is slow because the edges of the packaging material must be heated enough to melt to form a seal, requiring a relatively longer time. Thermal sealing may, however, provide some advantages to glue-based sealing. For example, a thermal seal may provide for greater seal integrity than provided using glue-based sealing. However, thermal sealing is typically at least an order of magnitude slower than glue-based sealing. Further, the glue seals typically are sensitive to the presence of food material in the seal area. The presence of food material within the seal area typically disrupts the seal. Thus, conventional packaging material sealing applications are often forced to choose between integrity of the seal and speed of formation of the seal.

Ultrasonic sealing may be employed to overcome some of the drawbacks inherent in cold glue-based sealing or thermal-based sealing. Typically, in ultrasonic sealing, ultrasonic energy, instead of conductive heat or an adhesive, is applied to the packaging materials to be sealed. The injection of ultrasonic energy into the packaging material typically heats the packaging material, causing the packaging material to partially melt and adhere to form a seal.

Historically, ultrasonic welding was developed as an alternative to welding technologies such as glue-based or thermal-based. Generally, ultrasonic welding has been employed in various applications for some time. The use of ultrasonic welding is a well established tool for sealing applications such as thermoplastics, textiles, and more recently, food product packaging sealing.

Typically, in processes for ultrasonic sealing of packaging materials, ultrasonic energy is applied to the packaging materials by passing the packaging materials between an ultrasonically activated horn and a stationary or rotary anvil. A typical ultrasonic horn is made of a metallic material having good acoustic qualities, such as aluminum or titanium. A typical anvil is also made of metallic material such as steel or aluminum and is positioned in opposition to the ultrasonic horn. Ultrasonic vibration in the horn is typically produced by supplying oscillatory electrical energy from an external power supply to an electromechanical transducer or converter, such as a piezoelectric crystal, which transforms the electrical energy into mechanical vibration. Typically, the mechanical vibration is then amplified by an amplitude transformer, or booster, to a predetermined operational amplitude. The booster is typically directly connected to the ultrasonic horn and supplies the ultrasonic vibration employed by the ultrasonic horn. Typically, the ultrasonic horn vibrates at between 20 Khz and 40 Khz.

Typically, an ultrasonic seal is created when packaging material is compressed between the ultrasonically activated horn and the stationary anvil or drum. The ultrasonically activated horn exerts ultrasonic vibrational energy on the packaging material. The ultrasonic energy causes the packaging material to heat. As the packaging heats, the packaging locally melts and adheres together along a pattern typically dictated by the design of the anvil. As the locally melted packaging cools upon leaving the horn and anvil, the packaging forms an ultrasonic seal.

As mentioned above, ultrasonic sealing has many advantages over traditional cold glue-based or thermal-based sealing. In comparison to cold glue sealing for example, ultrasonic sealing typically provides more reliable seal integrity. More reliable seal integrity may be achieved using ultrasonic sealing because there is no adhesive being used in the sealing. Therefore, the problems with adhesives such as an inadequate amount of pressure not sufficiently activating the cold glue are not found in ultrasonic sealing. Furthermore, adhesive-specific problems such as channeling are not typically encountered in ultrasonic sealing. Typically, because ultrasonic sealing heats and melts the packaging material together directly, the seal integrity is greater than that of cold glue. Another advantage in ultrasonic sealing of packaging material as opposed to cold glue is that an ultrasonic seal is typically much narrower than the seal width for cold glue. This reduction in the seal width may reduce the amount of packaging material required to package a food product by reducing the proportion of the packaging material used in to form the seal. The reduction in the amount of packaging material may lead to a reduction in overall conversion costs due to reducing the total consumption of packaging material.

Ultrasonic sealing may also have a number of advantages over traditional thermal-based sealing. A first advantage ultrasonic sealing may have over thermal sealing is speed. The injection of ultrasonic energy directly into the packaging material causes the packaging material to melt and seal more quickly than thermal-based sealing.

As described above, ultrasonic sealing has been successfully employed to ultrasonically seal packaging materials. Ultrasonically sealed packaging materials typically include three seals, a front end seal, a back end seal, and a longitudinal edge seal extending from the front end seal to the back end seal. Typically, ultrasonic sealing may be employed to seal either the front and back ends, or to seal the longitudinal edge, although at least one system employs ultrasonic seal to seal both the ends and edges.

U.S. Pat. No. 4,373,982, entitled "Ultrasonic Sealing Apparatus" (the '982 patent) illustrates one apparatus for ultrasonic sealing of the longitudinal edges of a plastic film. As shown in FIG. 5 of the '982 patent, the apparatus includes a forming structure 40, an anvil 44, and an ultrasonic horn 50. In operation, a plastic film 34 is supplied to the forming structure 40. The forming structure 40 forms the plastic film 34 into a tubular shape with contiguous edges. The contiguous edges of the plastic film 34 are then passed between an ultrasonic horn 50 and a stationary anvil 44. As the edges of the plastic film 34 pass between the ultrasonic horn 50 and the stationary anvil 44, the edges are ultrasonically sealed to form a longitudinal ultrasonic seal. After the longitudinal ultrasonic seal is formed, the plastic film 34 remains stationary while traditional glue or adhesive-based sealing techniques form a front end seal and a back end seal. The apparatus of the '982 patent provides for the intermittent, non-continuous sealing of the longitudinal edges of the plastic film 34. Because of the intermittent motion of the plastic film 34, the energy imparted to the plastic film 34 by the ultrasonic horn 50 must be controlled.

U.S. Pat. No. 4,517,790, entitled "Apparatus and Method For Ultrasonic Sealing of Packages" (the '790 patent) illustrates a method for ultrasonic sealing the front ends and back ends of packaging materials. As shown in FIG. 1, the invention of the '790 patent includes an ultrasonic end-sealing assembly 46 including a packaging film F, a back up anvil 48 rotated by a rotary drive shaft 50, and an ultrasonic horn 52. In operation, the packaging film F is supplied to the ultrasonic end-sealing assembly 46. The packaging film F is then passed between a single edge ultrasonic horn 52 and a single edge back up anvil 48 to form an ultrasonic end seal. The packaging film F has already been longitudinally edge sealed. The single edge ultrasonic horn 52 moves vertically in an up-and-down motion in conjunction with the rotating single edge back up anvil 48. That is, the ultrasonic horn 52 and back up anvil 48 are synchronized to draw towards each other at a specified time, thus trapping the packaging film F and ultrasonically sealing the packaging film F to form an ultrasonic end seal. The apparatus in the '790 patent only includes an ultrasonic end-sealing unit with a single edge, vertically-moving ultrasonic horn and a single edge, rotating back up anvil.

U.S. Pat. No. 4,534,818, entitled "Method and Apparatus for Ultrasonic Sealing" (the '818 patent) illustrates a method for ultrasonically end sealing and ultrasonically longitudinally edge sealing packaging materials as part of a form and fill packaging machine. With regard to longitudinal edge sealing, the method of the '818 patent operates substantially as described above with reference to the '982 patent. With regard to end sealing, as shown in FIG. 1, the method of the '818 patent includes an ultrasonic horn 12 mounted on an upper moveable jaw 16 and an ultrasonic anvil 14 mounted on a lower moveable jaw 18.

In operation, packaging material is formed into a tubular configuration and an ultrasonically longitudinally edge sealed to form edge sealed packaging material as in the '982 patent. Next, the ultrasonically edge sealed packaging material is passed between the upper and lower moveable jaws 16, 18. The upper and lower moveable jaws 16, 18 then compress the packaging material. As the upper and lower moveable jaws 16, 18 compress, the ultrasonic horn 12 mounted on the upper moveable jaw 16 compresses the packaging material between the ultrasonic horn 12 and ultrasonic anvil 14. The ultrasonic horn 12 injects ultrasonic energy into the packaging material to form an ultrasonic end seal, as described above. The food packaging thus has now been longitudinally edge sealed and front end sealed. After the ultrasonic front end seal is created, a food product is introduced into the edge sealed and front end sealed food package. Finally, the edge sealed and front end sealed food package containing the food product is passed between the upper and lower moveable jaws 16, 18 to form a back end seal. To form the back end seal, the upper and lower moveable jaws 16, 18 clamp down on the packaging material in a similar fashion to the formation of the front end seal. The ultrasonic horn 12 mounted to the upper moveable jaw 16 contacts the packaging material and injects ultrasonic energy to form an ultrasonic back end seal. Once the back end seal has been completed, the food product package containing food product has been completely sealed. As in the apparatus of the '790 patent, in the '818 patent, the edge seal and one end seal must be created prior to introducing food product into the packaging.

As described above, one of the limitations of the prior art systems is the inability to introduce a food product item without first performing a longitudinal edge seal and at least one end seal before. Systems such as those described above, that require product packaging to be completely ultrasonically edge and end sealed, prior to introducing food product into the sealed packaging may be less than optimal for other applications. For example, performing ultrasonic edge sealing and end sealing while intermittently introducing food products into the packaging may limit the speed of the packaging process. Also, positioning food product inside the packaging without trapping any food product in the seal may be difficult.

Thus, a need exists for a faster and more efficient food product packaging system. Additionally, a need exists for a food product packaging system that combines the speed of cold glue based sealing with the seal strength and integrity of thermal based sealing. Also, a need exists for a continuous flow wrap system rather than a form and fill type packaging system.

BRIEF SUMMARY OF THE INVENTION

The preferred embodiments of the present invention provide a method and system for ultrasonically sealing food product packaging directly around a food product. A preferred embodiment of the present invention includes a food product packaging-positioning unit that supplies food product packaging and food product into a direct on-item-packaging forming box. The direct on-item-packaging forming box then wraps the food product packaging directly over the top of the food product. The food product packaging is wrapped completely around the food product and forms overlapping ends in a vertically downward fin orientation below the food product creating a partially packaged food product.

The partially packaged food product then preferably enters an ultrasonic food product packaging fin-sealing unit. The food product packaging is then ultrasonically fin-sealed around the supplied food product prior to sealing the ends creating a partially sealed food product packaging. The partially sealed food product packaging then enters an ultrasonic end-sealing unit that ultrasonically end-seals and crimps the partially sealed food product packaging around the food product. This results in a continuous flow of individually packaged and fully ultrasonically sealed food product.

BRIEF DESCRIPTION OF THE DRAWINGS

FIG. 5 illustrates a cross sectional front view of ultrasonically fin-sealed food product packaging around a food product.

FIG. 6 illustrates a cross sectional view of an ultrasonically fin-sealed food product packaging around food products.

FIGS. 8A, 8B, 8C, 8D, and 8E illustrate two embodiments of infeed rollers of the ultrasonic fin-sealing unit and three operational configurations for the infeed rollers.

DETAILED DESCRIPTION OF THE INVENTION

Figure 1:
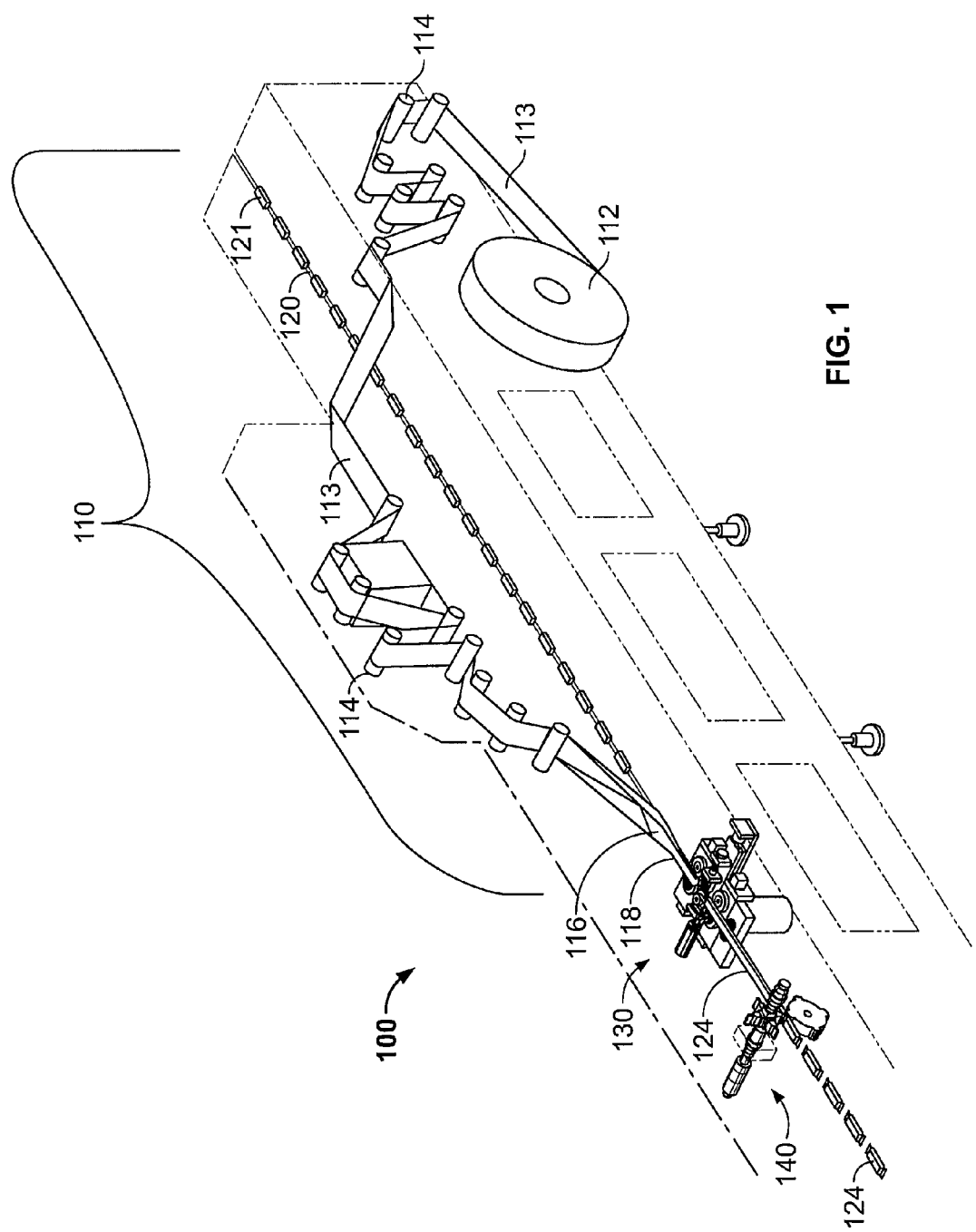
FIG. 1 illustrates an ultrasonic food product packaging system according to a preferred embodiment of the present invention.

FIG. 1 illustrates an exemplary ultrasonic food product packaging system 100 according to a preferred embodiment of the present invention. The ultrasonic food product packaging system 100 includes a product packaging-positioning unit 110, a food product conveyor system 120, an ultrasonic food product packaging fin-sealing unit 130, and an ultrasonic food product packaging end-sealing unit 140. The food product packaging-positioning unit 110 includes a direct on-item-packaging forming box 116.

As further described below, the direct on-item-packaging forming box 116 forms food product packaging around an unpackaged food product 121 to form a partially packaged food product 118. The ultrasonic food product packaging fin-sealing unit 130 fin seals the partially packaged food product 118 to form a partially sealed food product packaging 122. The ultrasonic food product packaging end-sealing unit 140 ultrasonically end seals the partially sealed food product packaging 122 to form a fully sealed food product 124.

The food product conveyor system 120 carries the food product through the ultrasonic food product packaging system 100. The food product conveyor system 120 extends from an upstream process such as food product producing machinery (not shown) to a downstream process (not shown) through the direct on-item-packaging forming box 116, ultrasonic food product packaging fin-sealing unit 130, and ultrasonic food product packaging end-sealing unit 140. As mentioned above, at the entry to the food product packaging-positioning unit 110, the food product carried by the food product conveyor system 120 is the unpackaged food product 121. As the food product conveyor system 120 progresses, the material carried by the food product conveyor system 120 becomes a partially packaged food product 118 after the direct on-item-packaging forming box 116, a partially sealed food product packaging 122 after the fin-sealing unit 130, and a fully sealed food product 124 after the end-sealing unit 140.

In addition to the direct on-item-packaging forming box 116, the food product packaging-positioning unit 110 includes a food product packaging roll 112, food product packaging 113, and food product packaging guidance rollers 114. The food product packaging roll 112 is a roll or spool of food product packaging 113. The food product packaging 113 has not been treated with an adhesive or glue for use in sealing the product packaging. The food product packaging roll 112 supplies food product packaging 113 to the direct on-item-packaging forming box 116 via a series of food product packaging guidance rollers 114, as shown. The guidance rollers 114 assist in positioning the food product packaging 113. Additionally, the guidance rollers 114 maintain the food product packaging 113 at a desired tension as the food product packaging 113 travels to the direct on-item-packaging forming box 116. Instead of the food product packaging roll 112, a sheet or web of food product packaging 113 may be employed. The direct on-item-packaging forming box 116 receives the food product packaging 113 and the unpackaged food product 121 from the food product conveyor system 120.

The food product packaging fin-sealing unit 130 is further described below with reference to FIG. 2. The food product packaging fin-sealing unit 130 is located after the direct on-item-packaging forming box 116 and before the ultrasonic food product packaging end-sealing unit 140 in the system progression.

The food product packaging end-sealing unit 140 is further described below with reference to FIG. 3. The food product packaging end-sealing unit 140 is located after the food product packaging fin-sealing unit 130 in the system progression. After the food product packaging end-sealing unit 140, the food product conveyor system 120 may deliver the fully packaged food product 124 to a conveying system or other packaging system (not shown) that may group the fully packaged food product 124 into plastic bags or cartons for shipping, for example.

In this preferred exemplary embodiment, the food product is formed bars of confectionery items, such as candy bars. The unpackaged food products 121 are carried by the conveyor system 120 in a single file, inline column as shown in FIG. 1. Alternatively, the unpackaged food product 121 may be formed into shapes other than bars such as drops, squares, or other preformed shapes. Other preferred embodiments of the present invention may be applied to food products such as granola bars, snack cakes, or other food products, for example.

Referring again to the direct on-item-packaging forming box 116 of the food product packaging-positioning unit 110, in operation, the unpackaged food product 121 is supplied to the direct on-item-packaging forming box 116 by the food product conveyor system 120. The food product packaging 113 is also supplied to the direct on-item-packaging forming box 116 from the food product packaging roll 112. The direct on-item-packaging forming box 116 folds the food product packaging 113 around the unpackaged food product 121 to form a partially packaged food product 118.

The direct on-item-packaging forming box 116 forms the partially packaged food product 118, in a number of steps. First, the direct on-item-packaging forming box 116 folds the food product packaging 113 over the top of the unpackaged food product 121. Next, the longitudinal edges of the food product packaging 113 are folded completely around and under the unpackaged food product 121. Thus, the longitudinal edges of the food product packaging 113 are aligned in a generally downward vertical alignment perpendicular to the food product conveyor system 120. As shown in FIG. 5, the longitudinal edges of the food product packaging 113 are then pressed together to form a partially packaged food product 118 having a fin 540 comprised of the aligned, pressed longitudinal edges. The partially packaged food product 118 is then delivered to the ultrasonic food product packaging fin-sealing unit 130 by the food product conveyor system 120.

Referring now to the ultrasonic food product packaging fin-sealing unit 130, the fin-sealing unit 130 receives the partially packaged food product 118 having the fin 540 as further illustrated in FIG. 5. At the fin-sealing unit 130, the fin 540 is passed between an ultrasonic fin-sealing horn 232 and a rotary anvil wheel 220 as further described below with reference to FIG. 2. As the fin 540 passes between the ultrasonic horn 232 and the anvil 220, ultrasonic energy is injected into the fin 540. The ultrasonic energy causes the longitudinal edges of the fin to seal together to form a fin seal 530. Once the fin 530 has been sealed, the partially packaged food product 118 becomes a partially sealed food product packaging 122. As shown in FIG. 1, the partially sealed food product packaging 122 is fin-sealed as a continuous strip and is not sealed at either front or back ends. The partially sealed food product packaging 122 is then delivered to the ultrasonic end-sealing unit 140 by the food product conveyor system 120.

Referring now to the ultrasonic end-sealing unit 140, the ultrasonic end-sealing unit 140 receives the partially sealed food product packaging 122. At the ultrasonic end-sealing unit 140, the partially sealed food product packaging 122 is passed between an ultrasonic end-sealing horn 315 and a rotary anvil 320. As further described below with reference to FIG. 3, the partially sealed food product packaging 122 is periodically compressed between the ultrasonic end-sealing horn 315 and rotary anvil 320. As the partially sealed food product packaging 122 is compressed, ultrasonic energy is injected into the partially sealed food product packaging 122. The ultrasonic energy causes the partially sealed food product packaging 122 to adhere, thus forming an end seal. The partially sealed food product packaging 122 is continuously advanced between the ultrasonic end-sealing horn 315 and rotary anvil 320. After the end seal is formed, the fully sealed food products 124 are then crimped and separated by a tool (not shown).

As described above, the fully sealed food products 124, are then delivered to a downstream process (not shown) such as a further packaging system, for example a Pick-and-Pack™ system.

Figure 2:
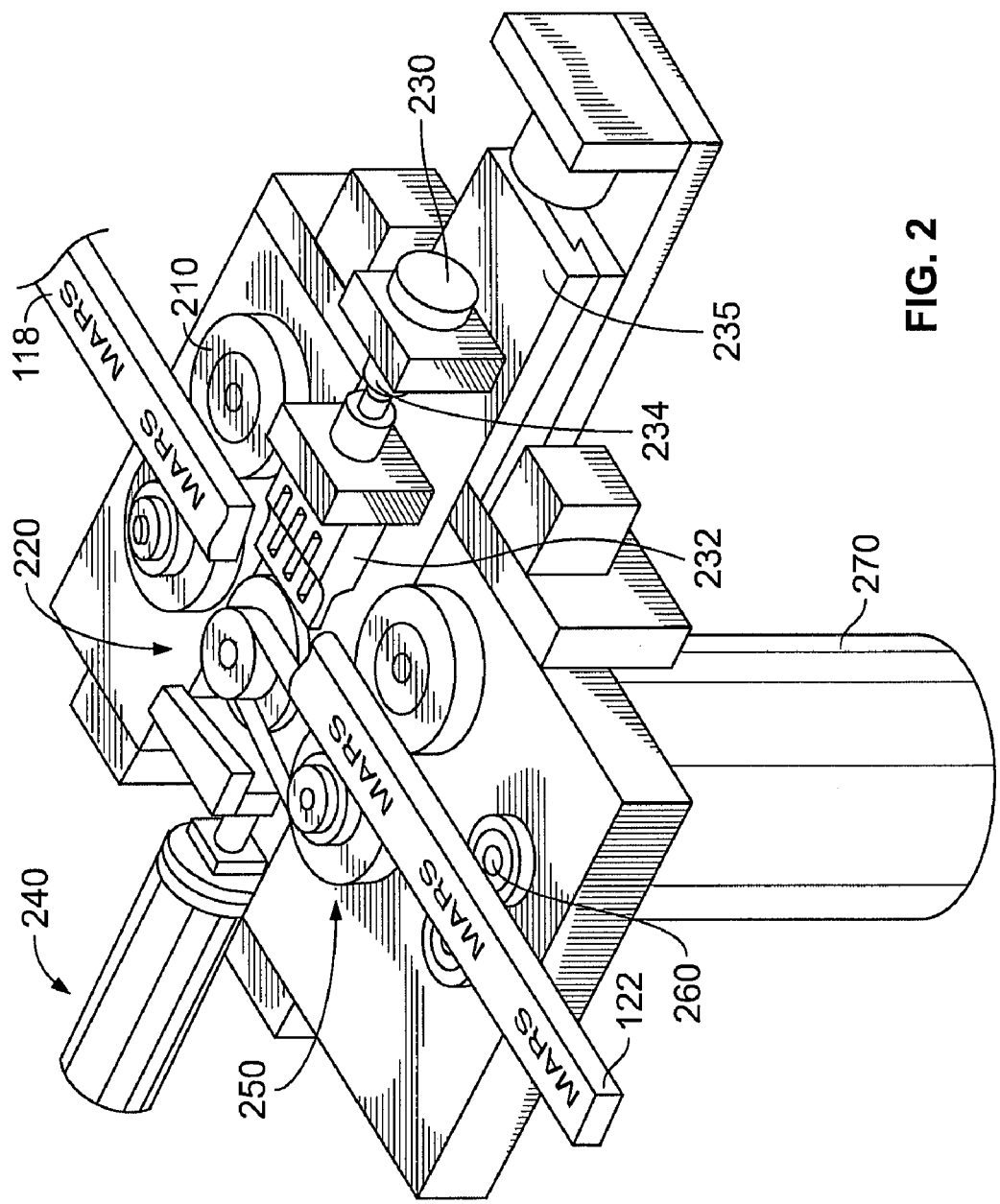
FIG. 2 illustrates an ultrasonic food product packaging fin-sealing unit according to a preferred embodiment of the present invention.

FIG. 2 illustrates an ultrasonic food product packaging fin-sealing unit 200 according to a preferred embodiment of the present invention. The ultrasonic food product packaging fin-sealing unit 200 includes a pair of infeed rollers 210, a rotating anvil wheel 220, a connector band 225, an anvil servo drive, or pneumatic anvil actuator 240, discharge rollers 250, fin fold down rollers 260, a drive motor 270, and an ultrasonic unit 230. The ultrasonic unit 230 includes an ultrasonic fin-sealing horn 232, an ultrasonic booster 234, and an air-operated slide 235. FIG. 2 also shows the partially packaged food product 118 and the partially sealed food product packaging 122 of FIG. 1.

As shown in FIG. 1, the ultrasonic food product packaging fin-sealing unit 200 receives the partially packaged food product 118 from the direct on-item-packaging forming box 116. As mentioned above, the partially packaged food product 118 includes the fin 540. The pair of infeed rollers 210 are positioned at the infeed of the fin-sealing unit 200. The infeed rollers 210 are preferably aligned horizontally and opposing each other and receive the fin 540 of the partially packaged food product 118. After the infeed rollers 210, the partially packaged food product 118 is passed between the ultrasonic fin-sealing horn 232 of the ultrasonic unit 230 and the rotating anvil wheel 220. The ultrasonic fin-sealing horn 232 and the rotating anvil wheel 220 are preferably aligned horizontally and opposing each other and receive the fin 540 of the partially packaged food product 118. The ultrasonic fin-sealing horn 232 and the rotating anvil wheel 220, operate in conjunction to seal the fin 540 to form a partially sealed food product packaging 122. The rotating anvil wheel 220 is aligned by the anvil servo drive 240 during ultrasonic fin-sealing and rotated using the connector band 225, as described below. After the fin-sealing horn 232 and the rotating anvil wheel 220, the partially sealed food product packaging 122 is passed between a pair of discharge rollers 250. The pair of discharge rollers 250 are preferably aligned horizontally and opposing each other and receive the fin 540 of the partially sealed food product packaging 122. The pair of discharge rollers 250 are rotated by the drive motor 270. The discharge roller 250 adjacent to the rotating anvil wheel 220 is connected to the rotating anvil wheel 220 by a connector band 225. The connector band 225 causes the rotating anvil wheel 220 to rotate along with the discharge rollers 250. After the pair of discharge rollers 250, the partially sealed food product packaging 122 is passed to the fin fold down rollers 260.

Alternatively, the rotating anvil wheel 220 may be stationary or the rotating anvil wheel 220 may be a metal drum. In another alternative, instead of using rollers, the partially packaged food product 118 may be advanced through the food product packaging fin-sealing unit 200 by a conveyor or a guidance track. In another embodiment of the present invention, instead of being aligned horizontally opposing each other, the infeed rollers 210, discharge rollers 250, fin fold down rollers 260, and the ultrasonic unit 230 and rotating anvil wheel 220, may be aligned vertically opposing each other. In the vertical embodiment, the partially packaged food product 118 may be advanced through the system by a side conveyor.

In operation, the partially packaged food product 118 is supplied to the ultrasonic food product packaging fin-sealing unit 200 from the direct on-item-packaging forming box 116 as described above with respect to FIG. 1. The partially packaged food product 118, having the fin 540, is pulled through the ultrasonic food product packaging fin-sealing unit 200 by the discharge rollers 250, which are rotated by the drive motor 270. As the partially packaged food product 118 enters the ultrasonic food product packaging fin-sealing unit 200, the infeed rollers 210 press the longitudinal edges of the partially packaged food product 118 together, thus maintaining the fin's 540 downward orientation as shown in FIG. 5. The infeed rollers 210 then feed the fin 540 between the rotating anvil wheel 220 and the ultrasonic fin-sealing horn 232.

As the fin 540 of the partially packaged food product 118 passes between the rotating anvil wheel 220 and the ultrasonic fin-sealing horn 232, it is injected with ultrasonic energy from the ultrasonic fin-sealing horn 232. The injection of ultrasonic energy into the fin 540 causes the longitudinal edges of the fin 540 to partially melt and adhere. The adherence of the longitudinal edges of the fin 540 forms an ultrasonic fin-seal 530 resulting in a partially sealed food product 122. During the ultrasonic fin-sealing, the anvil servo drive 240 maintains a desired operational pressure and alignment of the rotary anvil wheel 220 on the fin 540. Similarly, the air-operated slide 235 maintains a desired operational pressure and alignment of the ultrasonic fin-sealing horn 232 against the opposing side of the fin 540.

After the partially packaged food product 118 is ultrasonically fin-sealed, the resulting partially sealed food product packaging 122 passes between the discharge rollers 250. The discharge rollers 250 are rotated at a desired speed by the drive motor 270. The discharge rollers 250 supply the partially sealed food product packaging 122 to the fin fold down rollers 270. The fin fold down rollers 270 fold the fin seal 540 up from its downward vertical alignment perpendicular to the bottom edge of partially sealed food product 122 to a horizontal position flush with the bottom edge of the partially sealed food product 122. After passing between the fin fold down rollers 260, the partially sealed food product packaging 122 is supplied to the ultrasonic end-sealing unit 140 as further described below in FIG. 3.

Figure 3:
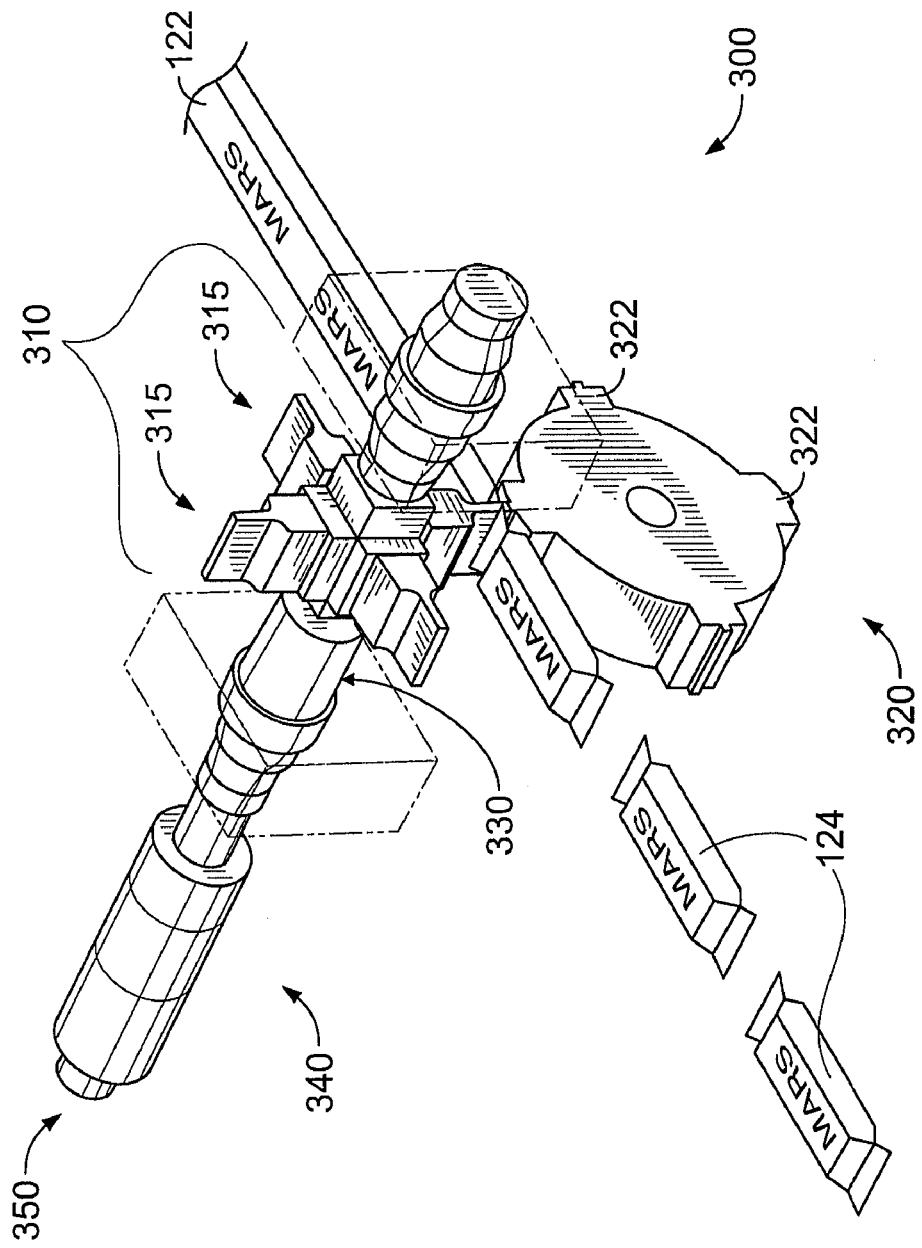
FIG. 3 illustrates an ultrasonic food product packaging end-sealing unit according to a preferred embodiment of the present invention.

FIG. 3 illustrates an ultrasonic food product packaging end-sealing unit 300 according to a preferred embodiment of the present invention. The ultrasonic food product packaging end-sealing unit 300 includes an ultrasonic horn unit 310 including four ultrasonic end-sealing horns 315, a rotary anvil 320 including four raised edges 322, an ultrasonic booster 330, a ballast booster 332, an ultrasonic converter 340, and a rotary connector 350. FIG. 3 also shows the partially sealed food product packaging 122 and a fully packaged and sealed food product 124 of FIG. 1.

As shown in FIG. 1, the ultrasonic food product packaging end-sealing unit 300 receives the partially sealed food product packaging 122 from the ultrasonic food product packaging fin-sealing unit 200. At the infeed of the food product packaging end-sealing unit 300 is the ultrasonic horn unit 310. In the preferred embodiment, the ultrasonic horn unit 310 includes four ultrasonic horns 315. The four ultrasonic end-sealing horns 315 are preferably arranged at 90-degree rotational angles from each other around a center point on the ultrasonic horn unit 310. The ultrasonic horn unit 310 is connected to the ultrasonic booster 330, the ultrasonic converter 340, and the ballast booster 332 by the rotary connector 350. The rotary connector 350 provides connection and horizontal alignment along the same axis to the ultrasonic booster 330, ultrasonic converter 340, ballast booster 332, and ultrasonic horn unit 310.

The food product packaging end-sealing unit 300 also includes the rotary anvil 320, which is positioned vertically below the ultrasonic horn unit 310. The ultrasonic horn unit 310 and the rotary anvil 320 are preferably aligned vertically opposing each other and receive the partially sealed food product packaging 122. The ultrasonic horn unit 310 and rotary anvil 320 operate in conjunction to seal the ends of the partially sealed food product 122 to form a fully sealed food product 124. In the preferred embodiment, the rotary anvil 320 also has four edges arranged at 90-degree rotational angles from each other around a center point on the rotary anvil.

Alternatively, the ultrasonic horn unit 310 may contain more or less ultrasonic horns, for example, two or eight ultrasonic horns, and may orient the ultrasonic horns at different angles. The number of ultrasonic horns and the angles depends on the desired product lengths. Alternatively, the rotary anvil 320 may also contain fewer or more edges, for example, two or eight edges, and may orient the edges at different angles.

In another alternative embodiment to the present invention, the ultrasonic horn unit 310 and the rotary anvil 320 may be located in a horizontally opposing alignment. In the horizontal embodiment, the partially sealed food product packaging 122 may enter the ultrasonic food product packaging end-sealing unit 300 with its fin on the side of the partially sealed food product 122. The ultrasonic horn unit 310 and the rotary anvil 320 may then rotate along a horizontal axis and ultrasonically end-seal the partially sealed food product 122.

In operation, the partially sealed food product packaging 122 is supplied to the ultrasonic food product packaging end-sealing unit 300 from the ultrasonic food product packaging fin-sealing unit 200. The partially sealed food product packaging 122 then passes between the ultrasonic horn unit 310 and the rotary anvil 320. The ultrasonic vibration of the ultrasonic horn unit 310 is preferably powered through the ultrasonic booster 330. The ultrasonic booster 330 amplifies a vibration that it receives from the ultrasonic converter 340. The ultrasonic converter 340 converts an oscillatory electrical signal into vibration motion, for example, by employing a piezoelectric crystal.

In operation, the ultrasonically activated horn unit 310 and the rotary anvil 320, rotate at similar rates. The rates of rotation of the ultrasonically activated horn unit 310 and the rotary anvil 320 are such that the partially sealed food product packaging 122 is periodically compressed at the desired compressive force value between one of the ultrasonic end-sealing horns 315 and one of raised edges 322 the rotary anvil 320.

As the partially sealed food product packaging 122 is compressed, ultrasonic energy from the ultrasonic end-sealing horn 315 is injected into the partially sealed food product packaging 122. The ultrasonic energy causes the partially sealed food product packaging 122 to 540 to partially melt and adhere, thus forming an end seal resulting in a fully sealed food product 124. In addition, the ends of the partially sealed food product packaging 122 may be end crimped or separated to form individual fully-sealed food products 124 as shown in FIG. 3. The individual fully-sealed food products 124 may be delivered to other downstream packaging machinery (not shown) such as a Pick-and-Pack™ sorter for example, for sorting or further packaging the individual fully sealed food products 124.

Figure 4:
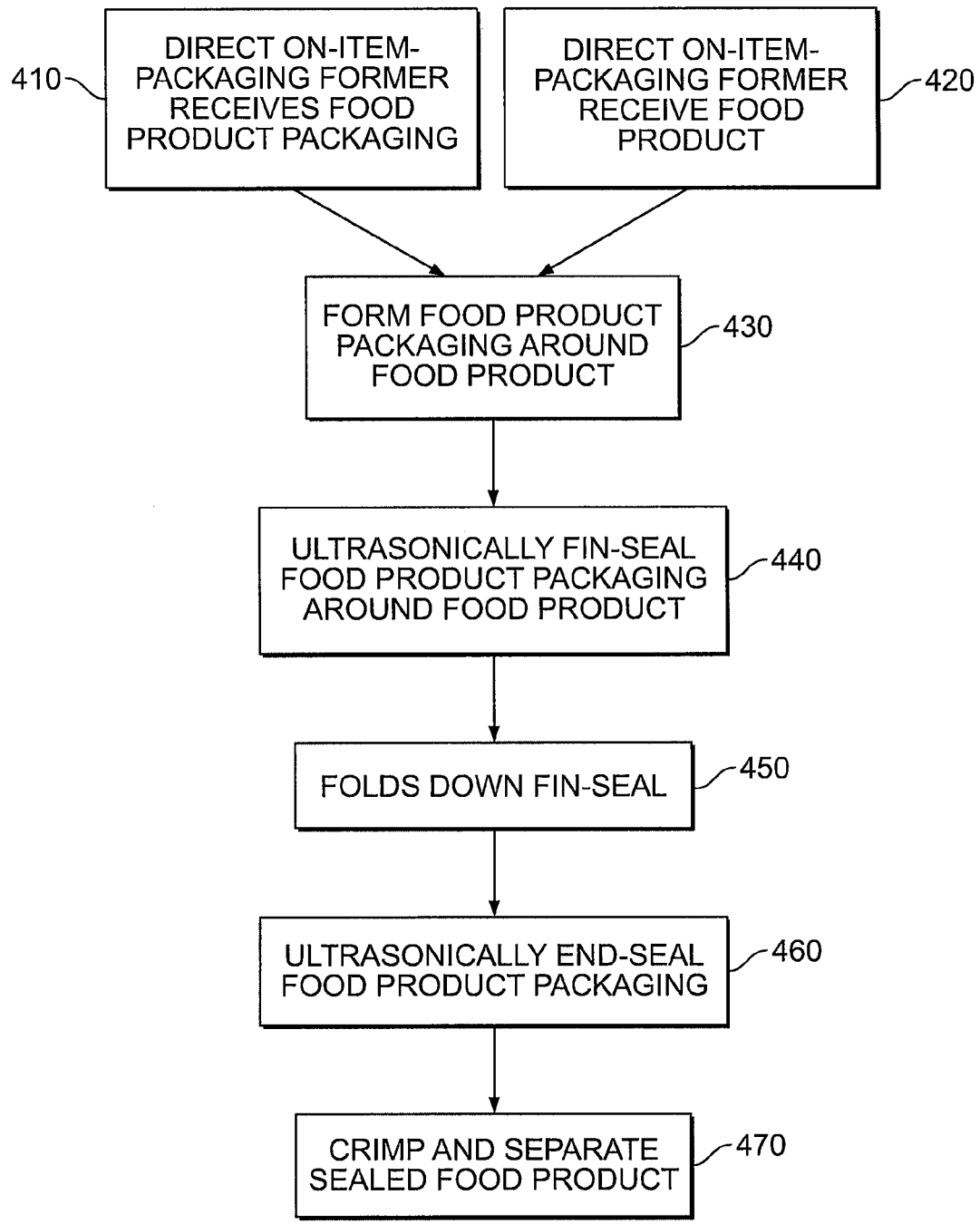
FIG. 4 illustrates a flow chart of the ultrasonic food product packaging system according to a preferred embodiment of the present invention.

FIG. 4 illustrates a flow chart 400 of the ultrasonic food product sealing system according to a preferred embodiment of the present invention. First, at step 410, the direct on-item-packaging forming box 116 receives food product packaging 113. At step 420, the direct on-item-packaging forming box 116 receives food product 121. Next, at step 430, the food product packaging 113 is formed around the food product 121 to form a partially packaged food product 118. Then, at step 440, the partially packaged food product 118 is ultrasonically fin-sealed to form a partially sealed food product 122. At step 450, the fin seal of the partially sealed food product 122 is folded down. Next, at step 460, the partially sealed food product 122 is ultrasonically end-sealed to form a fully sealed food product 124. Finally, at step 470, the front end and back end of the fully sealed food product 124 are crimped and separated.

FIG. 5 illustrates a cross sectional front view 500 of the ultrasonically fin-sealed partially sealed food product packaging 122 according to a preferred embodiment of the present invention. The cross sectional front view 500 includes an exterior packaging 510, a enclosed food product 520, an ultrasonic fin-seal 530, and a food product packaging fin 540.

As illustrated in the cross sectional front view 500, the exterior packaging 510 has been folded directly over the top of the enclosed food product 520. The food product 520 may be of any cross-sectional area. For example, the cross-sectional area of the food product 520 may be elliptical (as shown in FIG. 5), rectangular, triangular, circular, etc. The top of the exterior packaging 510 is in direct contact with the top of the enclosed food product 520. The exterior packaging 510 is also folded completely around the enclosed food product 520 resulting in a food product packaging fin 540 pointing vertically down below the enclosed food product 520. As shown, the food product packaging fin 540 has been ultrasonically fin-sealed by the ultrasonic fin-sealing unit 130, as described above, to form the ultrasonic fin-seal 530.

FIG. 6 illustrates a cross-sectional perspective view 600 of the ultrasonically fin-sealed partially sealed food product packaging 122 according to a preferred embodiment of the present invention. The cross-sectional perspective view 600 includes a exterior packaging 610, enclosed food products 620, an ultrasonically produced fin-seal 630, and a product gap 650.

As illustrated in the cross-sectional perspective view 600, the exterior packaging 610 has been folded directly over the top of the enclosed food products 620. That is, the top of the exterior packaging 610 is in direct contact with the top of the enclosed food products 620. The exterior packaging 610 has also been folded completely around the enclosed food products 620 and then ultrasonically fin-sealed to form an ultrasonic fin-seal 630. As illustrated in FIG. 6, the product gap 650 is spacing between the enclosed food products 620. In operation, the ultrasonic end-sealing unit 140 of FIG. 4 operates on the exterior packaging 610 in the product gap 650. The ultrasonic end-sealing unit 140 of FIG. 4 compresses, seals, and possibly crimps or separates the exterior packaging 610 in the product gap 650 to produce individually sealed and wrapped food products 124 as described above with reference to FIG. 3.

Figure 7A:
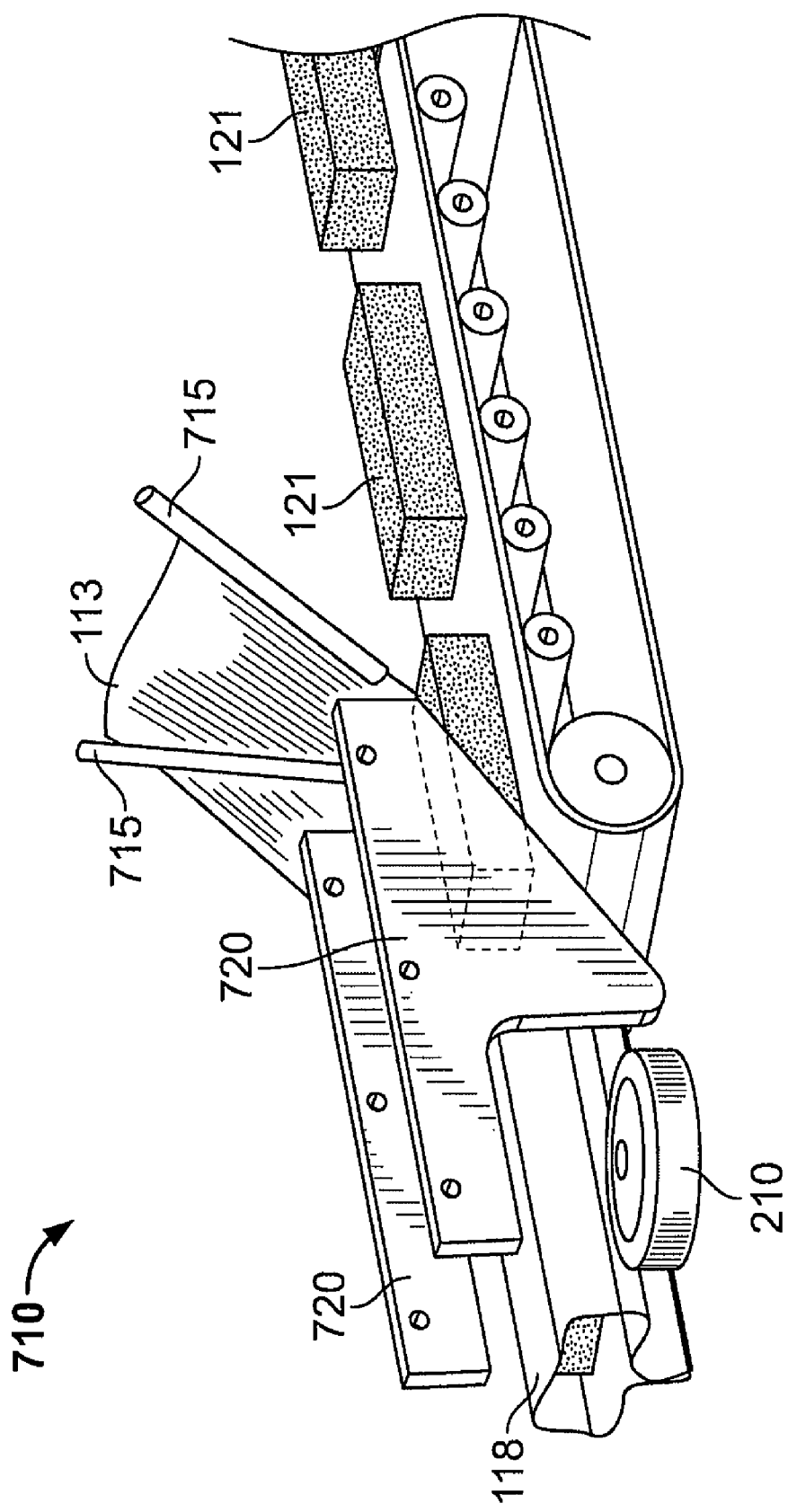
FIGS. 7A and 7B illustrate a perspective view and a side view of a direct on-item-packaging forming box.
Figure 7B:
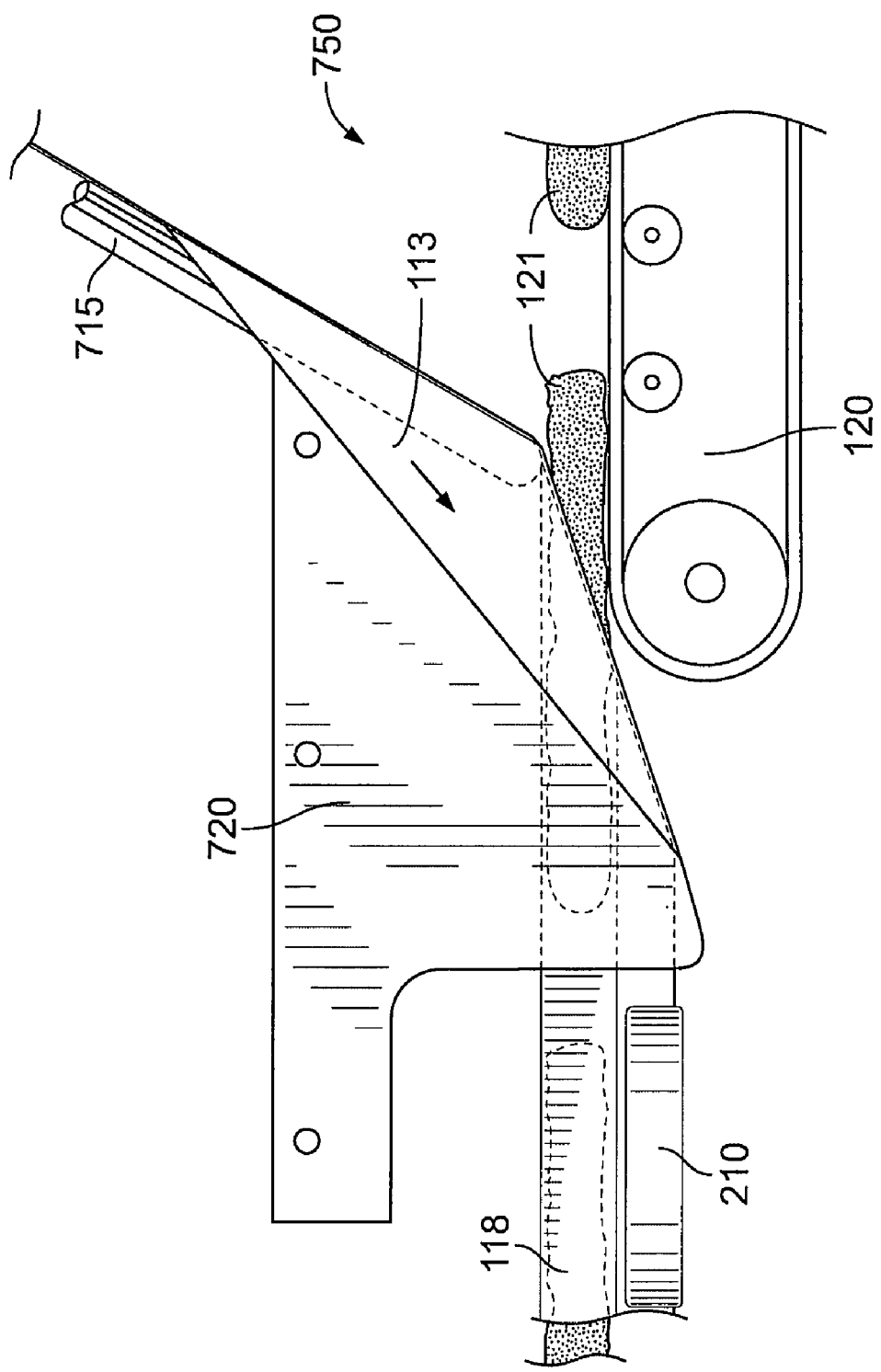
Figure 9A:
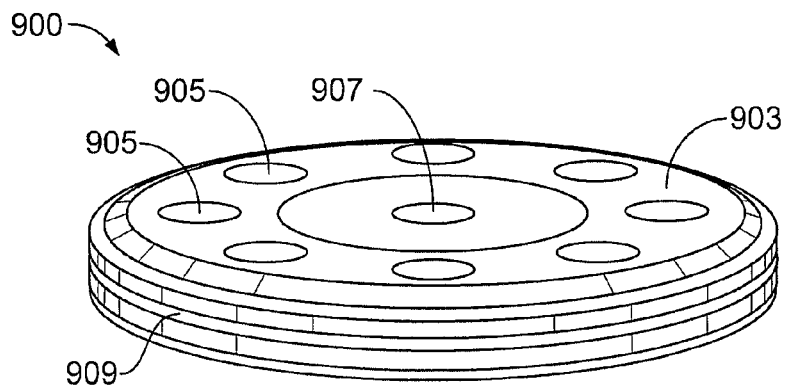
FIGS. 9A, 9B, 9C, 9D, 9E, and 9F illustrate one embodiment of a rotating anvil wheel of the ultrasonic fin-sealing unit and five operational configurations for the rotating anvil wheel.
Figure 9B:
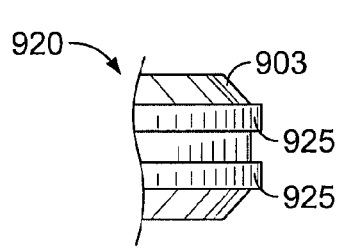
Figure 9C:
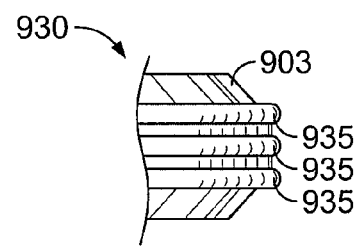
Figure 9D:
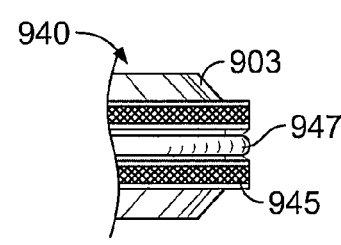
Figure 9E:
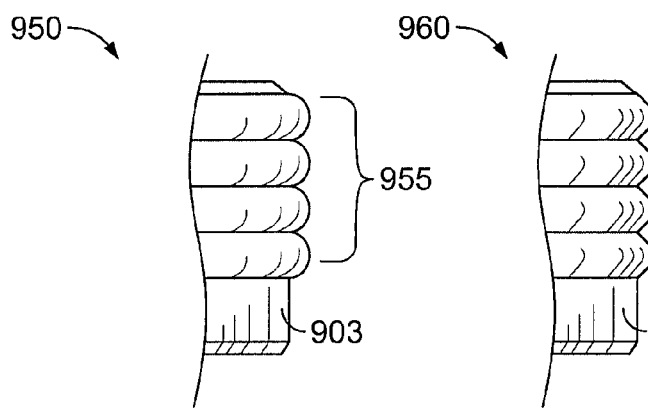
Figure 9F:
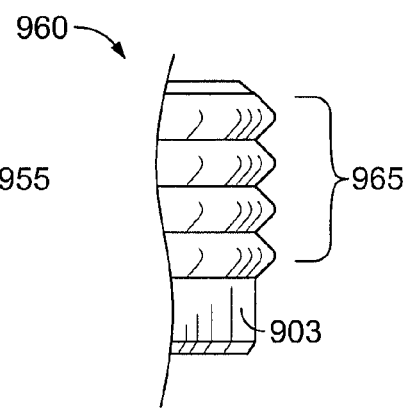

FIG. 7 illustrates a perspective view 710 and a side view 750 of a direct on-item-packaging forming box 700. The perspective view 710 includes the direct on-item-packaging forming box 700, the infeed rollers 210 of the ultrasonic fin-sealing unit 200, food product packaging 113, and the food product conveyor system 120 carrying an unpackaged food product 121, and a partially packaged food product 118.

The side view 750 further illustrates the operation of direct on-item-packaging forming box 700 as mentioned above. The side view includes the direct on-item-packaging forming box 700, the infeed rollers 210 of the ultrasonic fin-sealing unit 200, food product packaging 113, and the food product conveyor system 120 carrying an unpackaged food product 121, and a partially packaged food product 118.

The direct on-item-packaging forming box unit 700 includes a pair of forming bars 715 and a pair of side forming plates 720. The pair of forming bars 715 are located at the infeed end of the direct on-item-packaging forming box 700 and are connected to the pair of side forming plates 720. The infeed rollers 210 are located directly after the pair of forming bars 710 in the system progression.

In operation, food product packaging 113 is supplied to the direct on-item-packaging forming box unit 700 from the product packaging-positioning unit 110 as described above in FIG. 1. The food product packaging 113 is initially passed beneath the pair of forming bars 715 at the infeed of the direct on-item-packaging forming box unit 700. The pair of forming bars 715 guide the food product packaging 113 in a downward orientation between the pair of side forming plates 720. The pair of side forming plates 720 then form the food product packaging 113 directly around the supplied unpackaged food product 121 in a number of steps. At the first step, the food product packaging 113 is folded over the top of the unpackaged food product 121. At the next step, the food product packaging is wrapped around and under the unpackaged food product 121. At the final step, the edges of the food product packaging 113 aligned together under the unpackaged food product 121 in a downward alignment forming a fin 540 underneath the unpackaged food product resulting in a partially packaged food product 118. The fin 540 of the food product packaging is then passed between the infeed rollers 210 of the ultrasonic fin-sealing unit 200. The infeed rollers 210 pinch the fin 540 of the food product packaging 113 together and supply the partially packaged food product 118 to the ultrasonic food product packaging fin-sealing unit 130 where the partially packaged food product 118 is ultrasonically fin-sealed as described above with regard to FIG. 2.

The side view 750 of the direct on-item-packaging forming box 700 further illustrates the food product packaging 113 passing beneath the pair of forming bars 715 in a downward orientation and in between the pair of side forming plates 720. As the food product packaging 113 is passed between the pair of side forming plates 720, the fin 540 of the food product packaging 113 is passed between the infeed rollers 210.

FIG. 8 illustrates two embodiments 800 of the infeed rollers 210 of ultrasonic fin-sealing unit 200, including a grooved, or threaded infeed roller 810 and a polyurethane-coated infeed roller 820. FIG. 8 also includes three operational configurations for the infeed rollers 210, a grooved-grooved, or threaded-threaded configuration 830, a grooved-polyurethane, or threaded-polyurethane coated configuration 840, and a polyurethane coated-polyurethane coated configuration 850.

The grooved infeed roller 810 includes the feeding grooves 815 and a hollow center aperture 817. The feeding grooves 815 extend around the circumference of the grooved infeed roller 810. The feeding grooves 815 are oriented in a downward spiral. The grooved infeed roller 810 also includes the center aperture 817 to allow for the connection of the grooved infeed roller 810 to a rotating mechanism not shown.

The polyurethane-coated infeed roller 820 includes a smooth roller 823 with a center aperture 817, and a polyurethane coat 825. Polyurethane has been chosen for its ability to grip food product packaging however other gripping substances such as rubber or latex-based coating materials may be used instead. The polyurethane coat 825 extends around the outer circumference of the smooth roller 823. The polyurethane coat 825 may be a relatively thin layer of one to five millimeters, for example.

The grooved-grooved configuration 830 includes two grooved infeed rollers 810. The two grooved infeed rollers 810 are mounted in opposition to each other at the entry of the food product packaging fin-sealing unit 200, as shown in FIG. 2. The two grooved infeed rollers 810 are oriented so the feeding grooves 815 substantially mesh with a narrow gap between the two. In operation the fin of the food product packaging (not shown) is passed between the two grooved infeed rollers 810 as described above with reference to FIG. 1. The downward orientation of the feeding grooves 815 serve to pull the edges of the food product packaging in a downward motion around the unpackaged food product. The downward pulling of the food product packaging edges ensures that the food product packaging is tightly wrapped around the unpackaged food product reducing the amount of air in the unpackaged food product. The downward pulling of the feeding grooves 815 also maintains the alignment and presses together the food product packaging fin in preparation for ultrasonic fin-sealing thereby preventing unwanted slippage that may cause downtime in the system.

The grooved-polyurethane coated configuration 840 includes a grooved infeed roller 810 and a polyurethane-coated infeed roller 820. The grooved infeed roller 810 and the polyurethane-coated infeed roller 820 are mounted in opposition to each other at the entry of the food product packaging fin-sealing unit 200, as shown in FIG. 2. The grooved infeed roller 810 is oriented so the feeding grooves 815 are directly adjacent to the polyurethane-coated infeed roller 820 with a narrow gap between the two. In operation the fin of the food product packaging (not shown) is passed between the two infeed rollers as described above with reference to FIG. 1. The downward orientation of the feeding grooves 815 of the grooved infeed roller 810 serves to pull the edge of the food product packaging in a downward motion around the unpackaged food product. The downward pulling of the food product packaging edge ensures that the food product packaging is tightly wrapped around the unpackaged food product reducing the amount of air in the unpackaged food product. The downward pulling of the feeding grooves 815 also properly maintains the alignment and presses together the food product packaging fin in preparation for ultrasonic fin-sealing.

The polyurethane coated-polyurethane coated configuration 850 includes two polyurethane-coated infeed rollers 820. The two polyurethane-coated infeed rollers 820 are mounted in opposition to each other at the entry of the food product packaging fin-sealing unit 200, as shown in FIG. 2. In operation the fin of the food product packaging (not shown) is passed between the polyurethane-coated infeed rollers 820 as described above with reference to FIG. 1.

FIG. 9 illustrates one embodiment of a rotating anvil wheel 900 of the ultrasonic fin-sealing unit 200. The rotating anvil wheel 900 includes an anvil body 903, heat dissipating apertures 905, a center aperture 907, and an operational edge 909. FIG. 9 also includes five operational configurations for the operational edge 909 of the rotating anvil wheel 900, a flat energy director configuration 920, a rounded energy director configuration 930, a female knurled-rounded energy director configuration 940, a stacked round energy director configuration 950, and a stacked radiused energy director configuration 960.

The rotating anvil wheel 900 includes the anvil body 903 which contains the heat dissipating apertures 905 and a hollow center aperture 907. The heat dissipating apertures 905 extend around the circumference anvil body 903. The hollow center aperture 907 is located in the center of the anvil body 903 and allows for the connection of the rotating anvil wheel 900 to a rotating mechanism (not shown). Located around the outer circumference of the anvil body 903 is the operational edge 909. The operational edge 909 extends around the entire outer circumference of the anvil body 903 and may be comprised of one of the five operational configurations further described below.

In operation, an ultrasonic horn is positioned opposing the rotating anvil wheel 900 as illustrated in FIG. 2. As the fin of the food product packaging is passed between the ultrasonic horn and the rotating anvil wheel 900, ultrasonic energy is injected into the food product packaging between the ultrasonic horn and operational edge 909 of the rotating anvil wheel 900. The injection of ultrasonic energy into the food product packaging causes the material to partially melt and adhere as further described with reference to FIG. 2. While the operational edge 909 of the rotating anvil wheel 900 may be smooth, other configurations utilizing an energy director may be employed. An energy director is typically a raised surface that protrudes above the operational edge 909 of an anvil wheel. The energy director typically extends around the entire circumference of the anvil wheel and may be employed in a number of configurations as further described below. Typically, when an energy director is employed in ultrasonic sealing, the ultrasonic energy is directed between the edge of the ultrasonic horn and the energy director only as opposed to the entire edge of the anvil. Thus, the utilization of an energy director results in the more focused injection of ultrasonic energy into the food product packaging.

One energy director configuration which may be employed in ultrasonic sealing is a flat energy director configuration 920. The flat energy director configuration 920 includes the anvil body 903 and a flat energy director 925. The number of flat energy directors 925, as well as the space between and width of the flat energy director 925 may be adjusted depending on the desired number and width of ultrasonic seals. The use of a flat energy director 925 in ultrasonic sealing typically results in relatively wide and smooth ultrasonic seal.

A second energy director configuration which may be employed in ultrasonic sealing is a rounded energy director configuration 930. The rounded energy director configuration 930 includes the anvil body 903 and a round energy director 935. The number of round energy directors 935, as well as the space between and width of the round energy director 935 may be adjusted depending on the desired number and width of ultrasonic seals. The use of a round energy director 935 in ultrasonic sealing typically results in relatively narrow ultrasonic seal compared to the flat energy director 925. The rounding of the energy director results in a smaller contact area between the edges of packaging material as they pass between the ultrasonic horn and round energy director 935 on the rotating anvil wheel 900. The smaller contact area results in a narrower seal.

A third energy director configuration which may be employed in ultrasonic sealing is a female knurled-rounded energy director configuration 940. The female knurled-rounded energy director configuration 940 includes the anvil body 903, a rounded energy director 947, and a pair of female knurled energy directors 945. The female knurled energy directors 945 are typically flat energy directors with a cross-hatched pattern cut into them. The cross hatch pattern in the knurled energy directors 945 results in a cross hatched ultrasonic seal in the food packaging material when it is passed between an ultrasonic horn and a rotating anvil wheel 900 containing female knurled energy directors 945. The advantage of female knurled energy directors 945 over flat energy directors 925 or round energy directors 935 is strength. An ultrasonic seal formed using female knurled energy directors 945 are typically stronger than an ultrasonic seal formed using flat energy directors 925 or round energy directors 935. However, the integrity of the seal using female knurled energy directors 945 is typically not as good as the integrity of a seal created using flat energy directors 925 or round energy directors 935. Therefore, female knurled energy directors 945 may be used in conjunction with a round energy director 935 as shown in female knurled-rounded energy director configuration 940. The resulting ultrasonic seal formed by the female knurled-rounded energy director configuration 940 has the strength benefits of the female knurled energy directors 945 as well as the high seal integrity of a round energy director 935.

A fourth energy director configuration which may be employed in ultrasonic sealing is a stacked round energy director configuration 950. The stacked round energy director configuration 950 is comprised of an anvil body 903 and a number of round energy directors 955 stacked on top of each other. The stacking of round energy directors 955 results in multiple ultrasonic seals.

A fifth energy director configuration which may be employed in ultrasonic sealing is a stacked radiused energy director configuration 960. The stacked radiused energy director configuration 960 includes an anvil body 903 and a number of radiused energy directors 965 stacked on top of each other. The radiused energy directors 965 are similar to the round energy directors 955 except the radius of the energy director has been either increased or decreased resulting in either a wider or narrower surface of the energy director. The width of the ultrasonic seal of the radiused energy directors 965 depends on the radius selected.

Figure 10A:
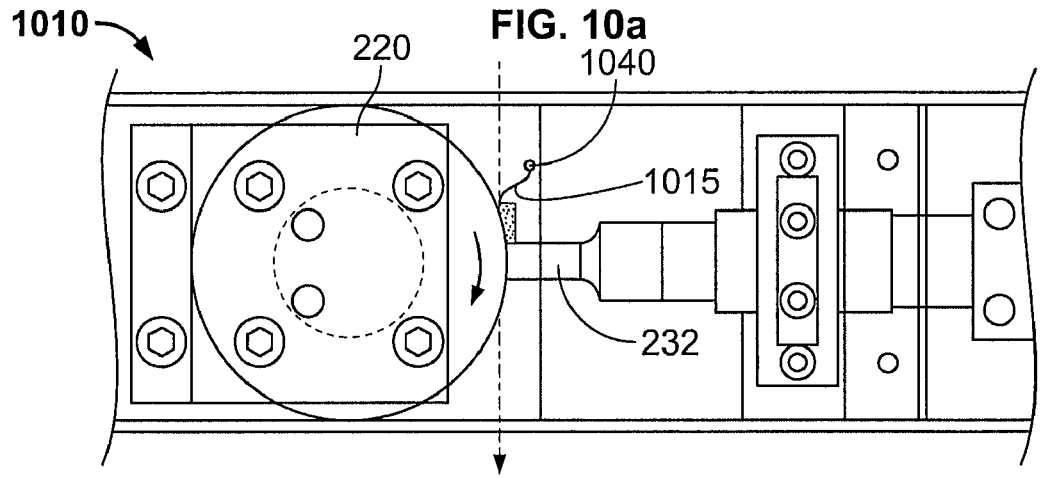
FIGS. 10A, 10B, and 10C illustrate three embodiments of a buffered ultrasonic horn.
Figure 10B:
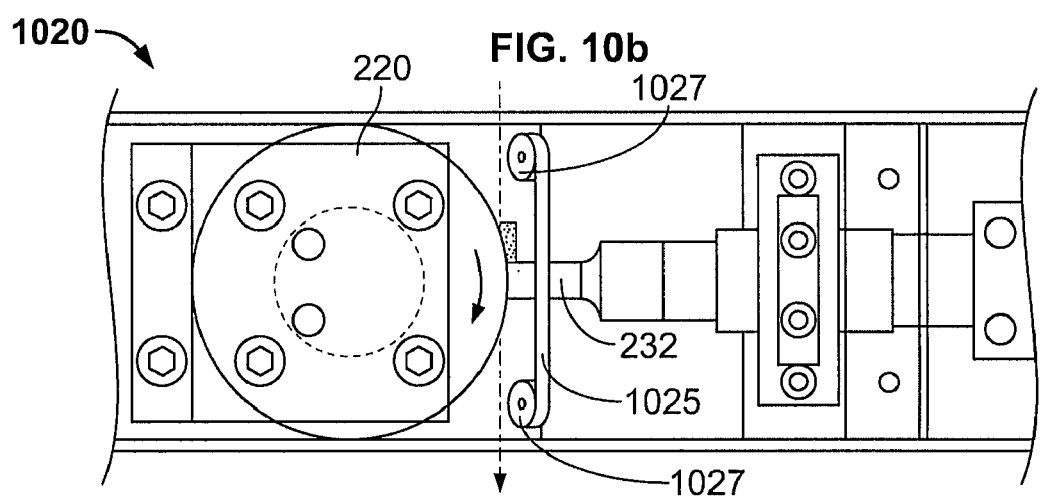
Figure 10C:
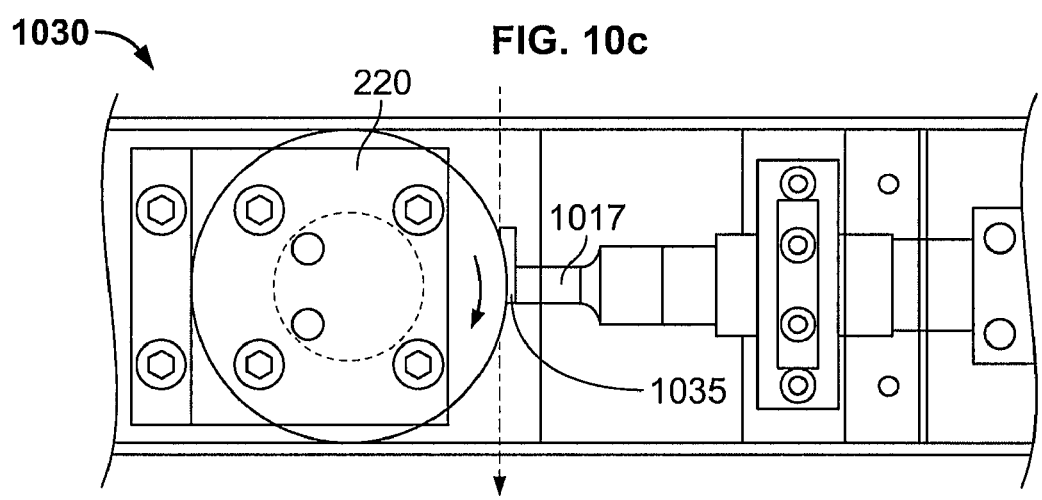

FIG. 10 illustrates three embodiments 1000 of a buffered ultrasonic horn including a flag assembly 1010, a cartridge assembly 1020, and a direct on-horn buffer 1030. The flag assembly 1010 includes a rotating anvil wheel 1010, an ultrasonic horn 1017, a buffer flag 1015, and a flag pin 1040. The rotating anvil wheel 1010 and ultrasonic horn 1020 are oriented as shown in FIG. 2. The buffer flag 1015 is typically made of Teflon, Kapton, or other buffering material. The buffer flag 1015 is attached to the flag pin 1040. The flag pin 1040 is typically located before the rotating anvil wheel 1010 and the ultrasonic horn 1017 in the system progression. Buffering dissipates the heat energy through the seal area, thereby minimizing the risk of perforation and damage to the seal. Further, buffering may optimize the system without the need for re-designing the system. That is, buffering may allow different packaging materials to be used within a system that applies different ultrasonic frequencies without the need for re-designing the system to compensate for the new packaging materials and frequencies.

In operation, food product packaging is passed between the rotating anvil wheel 1010 and the ultrasonic horn 1017 as previously described with reference to FIG. 2. However, in the flag assembly 1010, the buffer flag 1015 is placed between the edge of the ultrasonic horn 1017 and the packaging material. The buffer flag 1015 serves to buffer the ultrasonic energy injected into the packaging material from the ultrasonic horn 1017. Utilization of the buffer flag 1015 results in the more even application of ultrasonic energy to the packaging material by buffering out any spikes in the injection of energy. Further, buffering results in an intrinsically more robust seal.

The cartridge assembly 1020 includes a rotating anvil wheel 1010, an ultrasonic horn 1017, a buffer belt 1025, and belt rollers 1027. The rotating anvil wheel 1010 and ultrasonic horn 1020 are oriented as shown in FIG. 2. The cartridge assembly 1020 is typically made of Teflon, Kapton, or other buffering material. The buffer belt 1025 is wrapped around the belt rollers 1027. The belt rollers 1027 are typically located with one roller before the ultrasonic horn 1017 and one roller after.

In operation, food product packaging is passed between the rotating anvil wheel 1010 and the ultrasonic horn 1017 as previously described with reference to FIG. 2. However, the buffer belt 1025 is placed between the edge of the ultrasonic horn 1017 and the packaging material. The buffer belt 1025 serves to buffer the ultrasonic energy injected into the packaging material from the ultrasonic horn 1017. The buffer belt 1025 may be continuously or intermittently rotating around the belt rollers 1027 depending on the durability of the buffering material and speed of the process.

The direct on-horn buffer 1030 includes a rotating anvil wheel 1010 and a ultrasonic horn 1017 with a buffer 1035. The rotating anvil wheel 1010 and ultrasonic horn 1017 are oriented as shown in FIG. 2. The buffer 1035 is typically made of Teflon, Kapton, or other buffering material. The buffer 1035 is attached directly to the end of ultrasonic horn 1017 through a permanent bond or a temporary, replaceable self-adhesive patch. In operation, the direct on-horn buffer 1030 operates substantially similarly to the flag assembly 1010 and the cartridge assembly 1020 with the exception that the buffer 1035 is directly attached to the ultrasonic horn 1017.

Figure 11A:
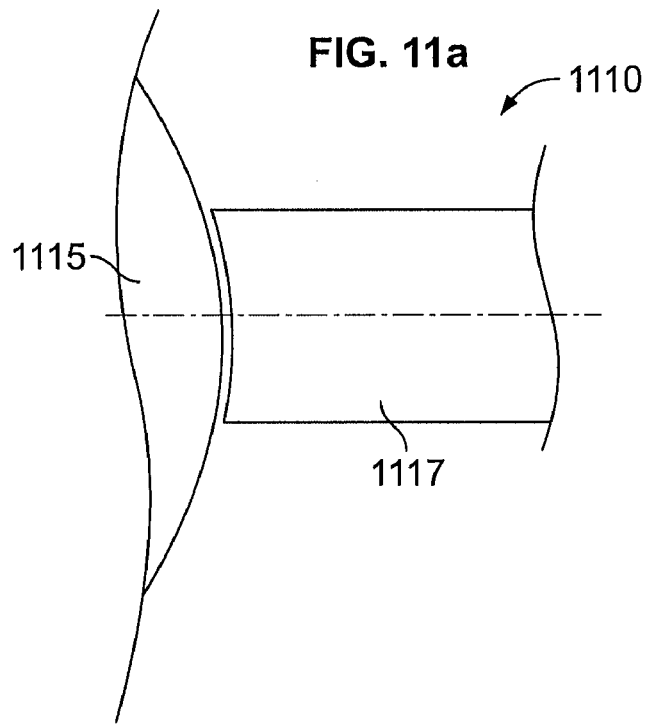
FIGS. 11A, 11B, and 11C illustrate three embodiments of ultrasonic horn edges and rotating anvil wheel configurations.
Figure 11B:
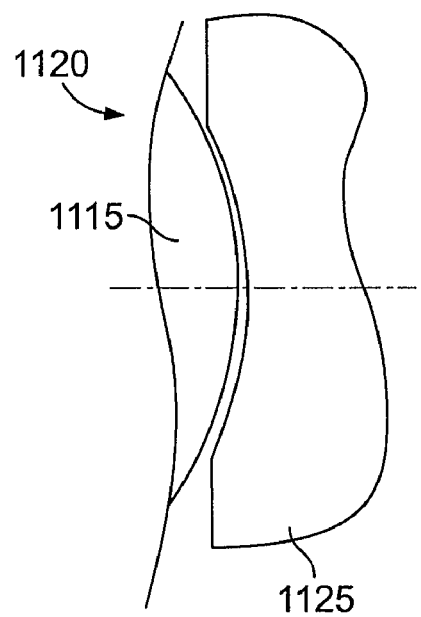
Figure 11C:
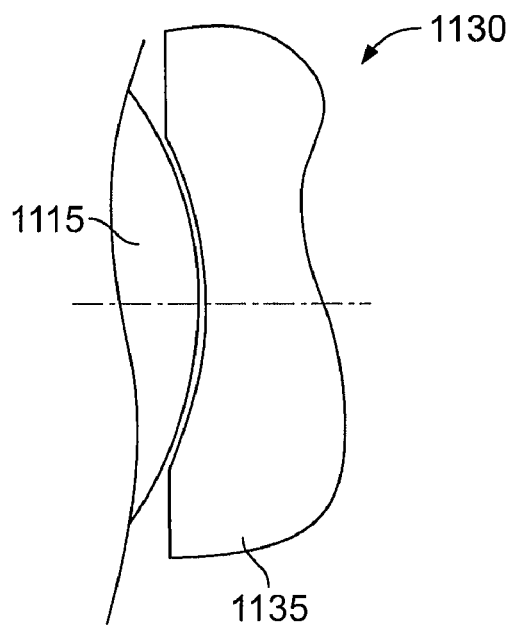

FIG. 11 illustrates three embodiments 1100 of ultrasonic horn edges and rotating anvil wheel configurations. The three embodiments 1100 of ultrasonic horn edges and rotating anvil wheel configurations include a straight-edge horn configuration 1110, a curved-edge horn configuration 1120, and a progressive gap curved-edge horn configuration 1130. The straight-edge horn configuration 1110 includes a straight-edge ultrasonic horn 1117 and a rotating anvil wheel 1115. In operation, food product packaging material passes between the straight-edge horn 1117 and the rotating anvil wheel 1115 as previously described with reference to FIG. 2.

The curved-edge horn configuration 1120 includes a curved-edge ultrasonic horn 1125 and a rotating anvil wheel 1115. In the curved-edge horn configuration 1120, the edge of the curved-edge ultrasonic horn 1125 meshes with the curvature of the rotating anvil wheel 1115. In operation, the meshing of the ultrasonic horn 1125 with the curvature of the rotating anvil wheel 1115 results in a larger surface area of the passing food product packaging to be contacted by the rotary anvil 1115 than in the straight-edge horn configuration 1110. In the straight-edge horn configuration 1110, only the tip of the rotating anvil wheel 1115 contacts the food product packaging. However in the curved-edge horn configuration 1120, the food product packaging is contacted by a larger portion of the rotating anvil wheel 1115.

The progressive gap curved-edge horn configuration 1130 includes a progressive gap-edge ultrasonic horn 1135 and a rotating anvil wheel 1115. The progressive gap curved-edge ultrasonic horn 1135 is more curved at the infeed side and less curved at the outfeed side. In operation, as food product packaging passes between the rotating anvil wheel 1115 and the progressive gap-curved edge ultrasonic horn 1135, the food product melts. The melting of the food product packaging results in a reduction in the thickness of the food product packaging. The progressive gap curvature results in the maximum contact and compressive force between the food product packaging and the rotating anvil wheel 1115. At the infeed of the progressive gap curved-edge ultrasonic horn 1135 and the rotating anvil wheel 1115 the gap is larger when the food product packaging is thickest prior to melting. At the outfeed of the progressive gap curved-edge ultrasonic horn 1135 and the rotating anvil wheel 1115 the gap is smaller when the food product packaging is thinnest after melting.

Figure 12:
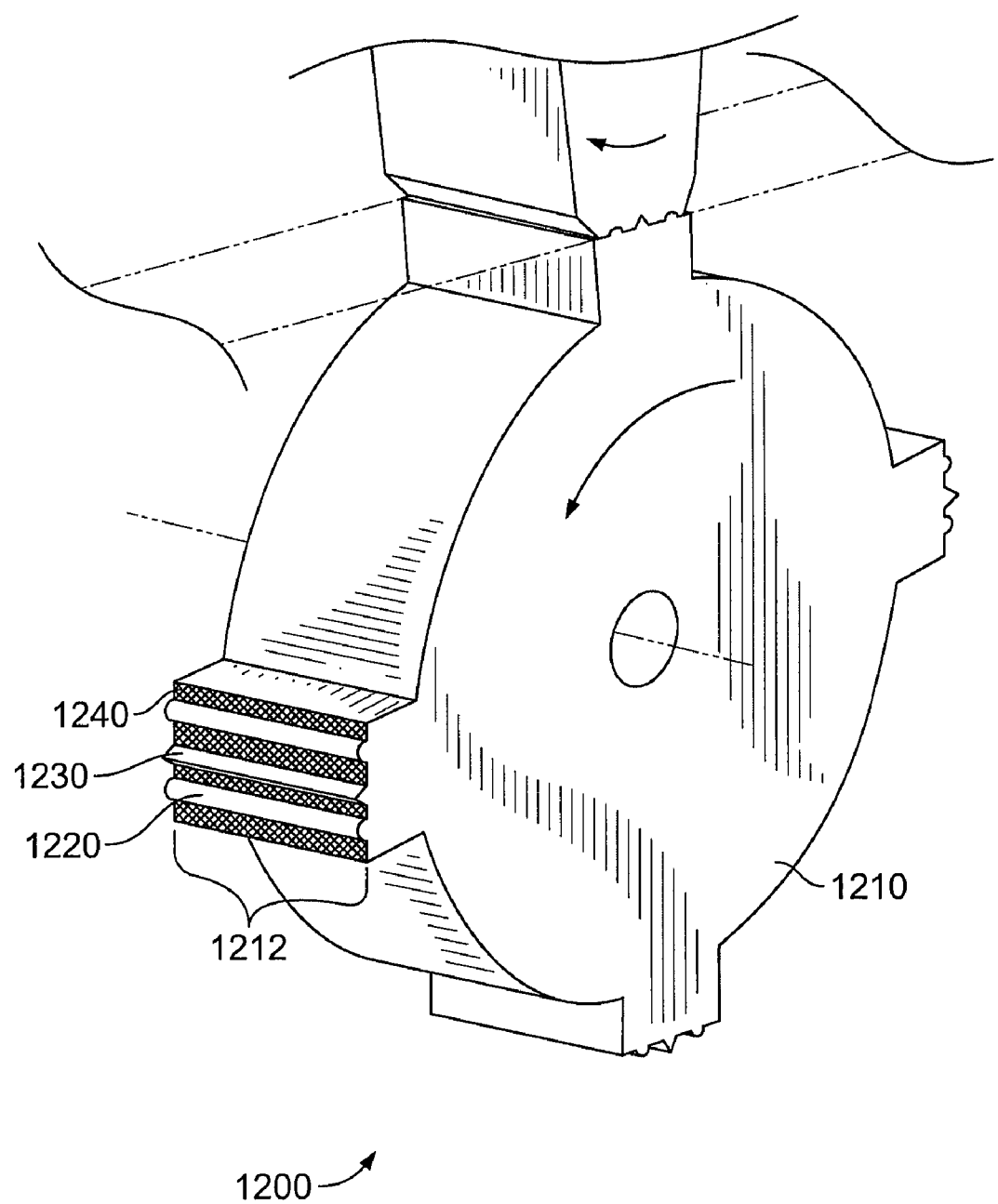
FIG. 12 illustrates a rotary anvil according to an alternative embodiment to the present invention.

FIG. 12 illustrates a rotary anvil 1200 according to an alternative embodiment to the present invention. The rotary anvil 1200 includes an anvil body 1210 and anvil edge 1212 and an ultrasonic horn 1250. The anvil edge 1212 includes a rounded energy director 1220, a separating energy director 1230, and a female knurl 1240. The rotary anvil is oriented as described above in FIG. 3. In operation, the rotary anvil 1200 rotates in conjunction with the ultrasonic horn 1250 to ultrasonically end-seal a food product packaging as previously described in FIG. 3. As the food product packaging is contacted between the rotary anvil 1200 and the ultrasonic horn 1250, the rounded energy director 1120 and female knurl 1240 result in an ultrasonic seal as describe in FIG. 9. As the food product packaging is being ultrasonically sealed, the separating energy director 1230 cuts the food product packaging resulting in a separated food product package.

FIGS. 1-12 above illustrate a number of embodiments of the present invention. However, other alternative embodiments may become apparent to those skilled in the art. For example, in an alternative embodiment of the present invention, instead of employing the food product packaging roll 112, the food product packaging 113 may be supplied to the product packaging-positioning unit 110 as a flat sheet of food product packaging.

In a second alternative embodiment, instead of delivering the unpackaged food product 121 to the product packaging-positioning unit 110 by using the food product conveyor system 120, the food product packaging 113 may be advanced along a conveyor and the food product 121 may be positioned on top of the food product packaging. For example, a dropper, conveyor, or other device may deliver the food product 121 onto the top of a flat sheet of the food product packaging 113. Thus, in the second alternative embodiment, the guidance rollers 114 are eliminated. Then, the direct on-item-packaging forming box 116 may then fold the food product packaging 113 up and over the top of the food product prior to ultrasonically fin-sealing it, as opposed to folding the food product packaging 113 down as in the preferred embodiment. After the ultrasonic fin-sealing, the system may be substantially similar to the preferred embodiment.

In a third alternative embodiment of the present invention, the ultrasonic end-sealing unit 140 may seal, crimp, and separate the ends of the partially sealed food product packaging 122 after passing multiple food product items, instead of after each individual food product item. That is, instead of sealing each food product item individually, two or more food product items may be sealed in the same fully sealed food product 124.

In a fourth alternative embodiment of the present invention, the ultrasonic end-sealing unit 140 may end seal each food product 121 individually, but crimp or separate the food product packaging 113 after passing two or more pieces of food product 121. Therefore, while each individual food product 121 is sealed in its own packaging, two or more food products 121 may be connected together in a convenient packaging.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for ultrasonically sealing food product packaging, said method including:
    sealing food product packaging by passing said food product packaging between an operably positioned rotating anvil and an ultrasonically activated rotating horn, wherein said rotating anvil has a plurality of anvil sealing surfaces distributed radially around said rotating anvil, and wherein said rotating horn has a plurality of horn sealing surfaces distributed radially around said rotating horn, wherein said food product packaging is passed between one of said plurality of horn sealing surfaces and one of said plurality of anvil sealing surfaces, wherein said rotating anvil rotates around a first axis of rotation and said rotating horn rotates around a second axis of rotation different from said first axis of rotation wherein a plurality of said plurality of anvil sealing surfaces are positioned at a fixed distance from said first axis of rotation, wherein said ultrasonically activated rotary horn rotates completely around said access of rotation so that at a first time a first of said plurality of horn sealing surfaces is operably positioned with respect to said rotating anvil wheel and so that at a second time a second of said plurality of horn sealing surfaces is operably positioned with respect to said rotating anvil wheel, wherein an ultrasonic converter is positioned axially to said ultrasonically activated rotating horn, wherein said ultrasonic converter causes said ultrasonically activated rotary horn to vibrate transversely to the radial direction of said rotating horn.

2. The method of claim 1 wherein said horn includes four horn sealing surfaces.

3. The method of claim 1 wherein said anvil includes four sealing surfaces.

4. The method of claim 1 further including:
ultrasonically cutting said food product packaging while sealing said food product packaging.

5. The method of claim 1 further including:
continuously advancing said food product packaging while sealing said food product packaging.

6. The method of claim 1 wherein said food product is a confectionery product.

7. A system for ultrasonically sealing food product packaging, said system including:
a rotating anvil, said anvil having a plurality of anvil sealing surfaces distributed radially around said rotating anvil, wherein said rotating anvil rotates around a first axis of rotation, wherein a plurality of said plurality of anvil sealing surfaces are positioned at a fixed distance from said first axis of rotation;

an ultrasonically activated rotating horn operably positioned with respect to said rotating anvil wheel, said rotating horn having a plurality of horn sealing surfaces distributed radially around said rotating horn, wherein said rotating horn rotates around a second axis of rotation different from said first axis of rotation, wherein said ultrasonically activated rotary horn rotates completely around said access of rotation so that at a first time a first of said plurality of horn sealing surfaces is operably positioned with respect to said rotating anvil wheel and so that at a second time a second of said plurality of horn sealing surfaces is operably positioned with respect to said rotating anvil wheel; and an ultrasonic converter positioned axially to said ultrasonically activated rotating horn, wherein said ultrasonic converter causes said ultrasonically activated rotary horn to vibrate transversely to the radial direction of said rotating horn.

8. The system of claim 7 wherein said horn includes four horn sealing surfaces.

9. The system of claim 7 wherein said anvil includes four sealing surfaces.

10. The system of claim 7 wherein said anvil and horn are adapted to ultrasonically cut said food product packaging while sealing said food product packaging.

11. The system of claim 7 wherein said horn and anvil seal said food product packaging while said food product packaging is continuously advanced.

12. The system of claim 7 wherein said food product is a confectionery product.

* * * * *